United States Patent
Asai et al.

(10) Patent No.: US 11,247,659 B2
(45) Date of Patent: Feb. 15, 2022

(54) VEHICLE CONTROL APPARATUS

(71) Applicant: AISIN SEIKI KABUSHIKI KAISHA, Kariya (JP)

(72) Inventors: Takatomo Asai, Nagoya (JP); Hirotaka Mizuguchi, Kariya (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 341 days.

(21) Appl. No.: 16/048,783

(22) Filed: Jul. 30, 2018

(65) Prior Publication Data

US 2019/0047546 A1 Feb. 14, 2019

(30) Foreign Application Priority Data

Aug. 8, 2017 (JP) .............................. JP2017-153417
Aug. 8, 2017 (JP) .............................. JP2017-153419

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *B60W 30/20* (2013.01);
(Continued)

(58) Field of Classification Search
CPC ...... B60W 20/15; B60W 10/06; B60W 10/08; B60W 30/20
See application file for complete search history.

(56) References Cited

U.S. PATENT DOCUMENTS 5,185,543 A 2/1993 Tebbe
7,565,938 B2 * 7/2009 Hisada .................. B60K 6/445
180/65.1
(Continued)

FOREIGN PATENT DOCUMENTS

DE 102006012387 A1 * 11/2007 .......... G01M 15/046
JP 04-211747 8/1992
(Continued)

OTHER PUBLICATIONS

Mueller De Vries Immo, Internal combustion engine's torque . . . , Nov. 8, 2007. (Year: 2020).*

*Primary Examiner* — Thomas Ingram
*Assistant Examiner* — Omar K Morsy
(74) *Attorney, Agent, or Firm* — Oblon, McClelland, Maier & Neustadt, L.L.P.

(57) ABSTRACT

A vehicle control apparatus is applied to a vehicle so as to control driving of an electric motor of the vehicle. The vehicle control apparatus includes: a frequency calculation unit configured to calculate an engine pulsation frequency; a damping control content switching unit configured to switch a damping control content; a gain calculation unit configured to calculate a gain, used for a torque command for driving the electric motor; a torque calculation unit configured to calculate the torque command by multiplying the calculated gain by at least one of a torsion torque reduction component and a motor torque reduction component; a command torque determination unit configured to determine a damping control torque command; and a drive control unit configured to control the driving of the electric motor based on the damping control torque command.

10 Claims, 8 Drawing Sheets

(51) Int. Cl.
*B60W 10/08* (2006.01)
*B60W 30/20* (2006.01)

(52) U.S. Cl.
CPC .............. *B60W 2030/206* (2013.01); *B60W 2710/0666* (2013.01); *B60W 2710/083* (2013.01)

(56) References Cited

U.S. PATENT DOCUMENTS

| | | | | |
|---|---|---|---|---|
| 8,087,508 B2 * | 1/2012 | Hedman | ................ | F16D 13/68 192/213.1 |
| 8,256,278 B2 * | 9/2012 | Lee | ................ | G01M 15/11 73/114.04 |
| 8,825,291 B2 * | 9/2014 | Oikawa | ................ | B60K 6/445 701/37 |
| 9,932,040 B2 * | 4/2018 | Yamamoto | ........... | B60W 10/115 |
| 2004/0142790 A1 * | 7/2004 | Tomura | ................ | B60K 6/445 477/2 |
| 2013/0296103 A1 * | 11/2013 | Dai | ................ | B60W 10/08 477/5 |
| 2014/0371967 A1 * | 12/2014 | Miwa | ................ | B60W 30/20 701/22 |
| 2017/0205778 A1 * | 7/2017 | Barrass | ................ | G05B 9/02 |
| 2018/0245663 A1 * | 8/2018 | Yoshikawa | ....... | F16F 15/13469 |

FOREIGN PATENT DOCUMENTS

| | | |
|---|---|---|
| JP | 2013-129260 | 7/2013 |
| JP | 2017-100580 | 6/2017 |

\* cited by examiner

VEHICLE CONTROL APPARATUS

CROSS REFERENCE TO RELATED APPLICATIONS

This application is based on and claims priority under 35 U.S.C. § 119 to Japanese Patent Applications 2017-153417 and 2017-153419, both filed on Aug. 8, 2017, the entire contents of which are incorporated herein by reference.

TECHNICAL FIELD

This disclosure relates to a vehicle control apparatus, which suppresses vibration of a vehicle.

BACKGROUND DISCUSSION

In the related art, an apparatus, which attenuates torsional vibration in a power train of a vehicle disclosed in, for example, JP 04-211747 A (Reference 1) is known. A vehicle equipped with the apparatus known in the related art is configured such that a crankshaft of an engine and an input shaft of a transmission are connected to each other via a torsional vibration damper, and an electric motor is connected to the input shaft. Then, with respect to the torque fluctuation of a damper torque input to the input shaft from the crankshaft of the engine via the torsional vibration damper, the apparatus known in the related art generates, in the electric motor, a torque that has a reverse phase with respect to the torque fluctuation and the same amplitude as the torque fluctuation, thereby eliminating the vibration of a power train.

In addition, in the related art, a hybrid vehicle disclosed in, for example, JP 2013-129260 A (Reference 2) is also known. In the hybrid vehicle known in the related art, an engine and a drive shaft are connected to each other via a damper, and an electric motor is connected to the drive shaft. Then, the hybrid vehicle known in the related art generates the sum of a torque, having a reverse phase with respect to the torque fluctuation of the engine (the torque fluctuation of a damper torque), and a torque, having a reverse phase with respect to the torque generated according to the rotational speed of the electric motor, in the electric motor, thereby suppressing the torque fluctuation of the engine at the time of starting the engine.

In a torsion damper such as a torsional vibration damper or a damper, the amount of torsion increases as an engine pulsation frequency, which is the frequency of torque pulsation generated in proportion to the rotational speed of the engine, approaches a damper resonance frequency in the torsional direction of the torsion damper, and the amount of torsion decreases as the engine pulsation frequency becomes lower than the damper resonance frequency. Then, the torsion damper generates a torsion torque that varies depending on the amount of torsion, thereby attenuating torque fluctuation. Therefore, the torsion damper inputs a relatively large torsion torque, generated according to torsion, to the input shaft or the drive shaft when the amount of torsion is large, and inputs a relatively small torsion torque to the input shaft or the drive shaft when the amount of torsion is small.

On the other hand, the electric motor, which is connected to the input shaft, the transmission, and the drive shaft (the power train), generates a motor torque including an inertia torque component that varies according to rotation. The inertia torque component that varies according to rotation depends on the rotational speed of the electric motor (more specifically, the rotational angular acceleration of the electric motor), and increases as the rotational speed of the electric motor decreases, and decreases as the rotational speed of the electric motor increases. Therefore, the electric motor inputs a relatively large motor torque to the input shaft or the drive shaft (the power train) in the case of a low rotational speed, and inputs a relatively small motor torque to the power train in the case of a high rotational speed.

Therefore, when the vehicle travels, the torsion torque generated according to the torsion of the torsion damper and the motor torque generated according to the rotation of the electric motor are input to the power train. Thus, the vibration is generated in the power train due to the varying torsion torque and the varying motor torque. In particular, when the engine pulsation frequency is lower than the damper resonance frequency, in other words, when the rotational speeds of the engine and the electric motor are small, the torsion torque decreases according to the amount of torsion of the torsion damper, whereas the motor torque (a viscous torque component or an inertia torque component) increases, so that vibration is generated in the power train.

However, the apparatus disclosed in Reference 1 merely generates a torque, which has a reverse phase with respect to the torsion torque and the same amplitude as the torsion torque, in the electric motor so as to offset the varying torsion torque. That is, the apparatus disclosed in Reference 1 may not offset the motor torque, which is generated to vary due to the rotation of the electric motor. Thus, the apparatus disclosed in Reference 1 may not sufficiently attenuate (suppress) the vibration, which is generated in the input shaft (the power train) due to the fluctuation of the motor torque (the viscous torque component or the inertia torque component).

In addition, the hybrid vehicle disclosed in Reference 2 may suppress the vibration of the engine caused by the torque fluctuation at the time of starting the engine. However, no consideration is given to the suppression of the vibration generated in the drive shaft (the power train) during traveling. Thus, in the hybrid vehicle disclosed in Reference 2, vibration is generated in the drive shaft (power train) during traveling, and as a result, a driver feels discomfort by perceiving sound (e.g., booming noise) entering the vehicle cabin in some cases.

Thus, a need exists for a vehicle control apparatus which is not susceptible to the drawback mentioned above.

SUMMARY

A vehicle control apparatus according to an aspect of this disclosure is applied to a vehicle so as to control driving of an electric motor of the vehicle. The vehicle includes an engine; a transmission; a clutch configured to connect and disconnect a crankshaft of the engine and an input shaft of the transmission; a torsion damper configured to allow relative rotation of the crankshaft and the input shaft by torsional deformation in a connection state of the clutch; a wheel connected to a drive shaft of the transmission; and the electric motor connected to one of the input shaft, the transmission, and the drive shaft, which constitute a power train that transmits power of the engine to the wheel. The vehicle control apparatus includes: a frequency calculation unit configured to calculate an engine pulsation frequency that indicates a frequency of torque pulsation generated in the engine in proportion to a rotational speed of the engine and to calculate a damper resonance frequency, at which the torsion damper resonates with the engine pulsation frequency in a torsional direction; a damping control content switching unit configured to switch a damping control content that suppresses vibration generated in the power train using the engine pulsation frequency and the damper resonance frequency; a gain calculation unit configured to calculate a gain, used for a torque command for driving the electric motor, using the engine pulsation frequency and the damper resonance frequency according to the damping control content switched by the damping control content switching unit; a torque calculation unit configured to calculate the torque command by multiplying the calculated gain by at least one of a torsion torque reduction component having a reverse phase with respect to a torsion torque generated by the torsion damper and a motor torque reduction component having a reverse phase with respect to a motor torque generated according to rotation of the electric motor; a command torque determination unit configured to determine a damping control torque command, which generates, in the electric motor, a damping control torque for suppressing the vibration generated in the power train, based on the torque command; and a drive control unit configured to control the driving of the electric motor based on the damping control torque command so as to generate the damping control torque in the electric motor.

In this configuration, it is preferable that the damping control content switching unit determines a case where the engine pulsation frequency is less than a first frequency obtained by subtracting a first predetermined value from the damper resonance frequency, a case where the engine pulsation frequency is equal to or greater than the first frequency and is also equal to or less than a second frequency obtained by adding a second predetermined value to the damper resonance frequency, and a case where the engine pulsation frequency is greater than the second frequency.

According to the configuration described above, the control apparatus can switch the damping control content according to the case where the engine pulsation frequency is less than the first frequency, the case where the engine pulsation frequency is equal to or greater than the first frequency and is also equal to or less than the second frequency, and the case where the engine pulsation frequency is greater than the second frequency. Then, the control apparatus may calculate the torque command by calculating the gain according to the damping control content, and may finally control the driving of the electric motor based on the damping control torque command. Thereby, it is possible to satisfactorily suppress (attenuate) the vibration generated in the power train during the driving of the vehicle, and to prevent a driver from feeling discomfort by perceiving unpleasant vibration or sound (e.g., booming noise) entering the vehicle room.

In addition, the control apparatus can change the ratios of the torsion torque reduction component and the inertia torque reduction component by calculating a first gain and a second gain according to the engine pulsation frequency, thereby generating the damping control torque, which suppresses (attenuates) the vibration generated in the power train, in the electric motor. Thereby, in particular, the second gain may be calculated so as to be larger in the case where the engine pulsation frequency is less than the damper resonance frequency, thereby suppressing (attenuating) the vibration generated in the power train due to the motor torque (inertia torque component) of the electric motor. Thus, it is possible to satisfactorily suppress (attenuate) the vibration generated in the power train during the driving of the vehicle and to prevent the driver from feeling discomfort by perceiving unpleasant vibration or sound (e.g., booming noise) entering the vehicle room.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here (hereinafter also referred to as "the present embodiment") will be described with reference to the accompanying drawings. In addition, each drawing used for explanation is a conceptual diagram, and the shape of each part is not necessarily rigid in some cases.

Figure 1:
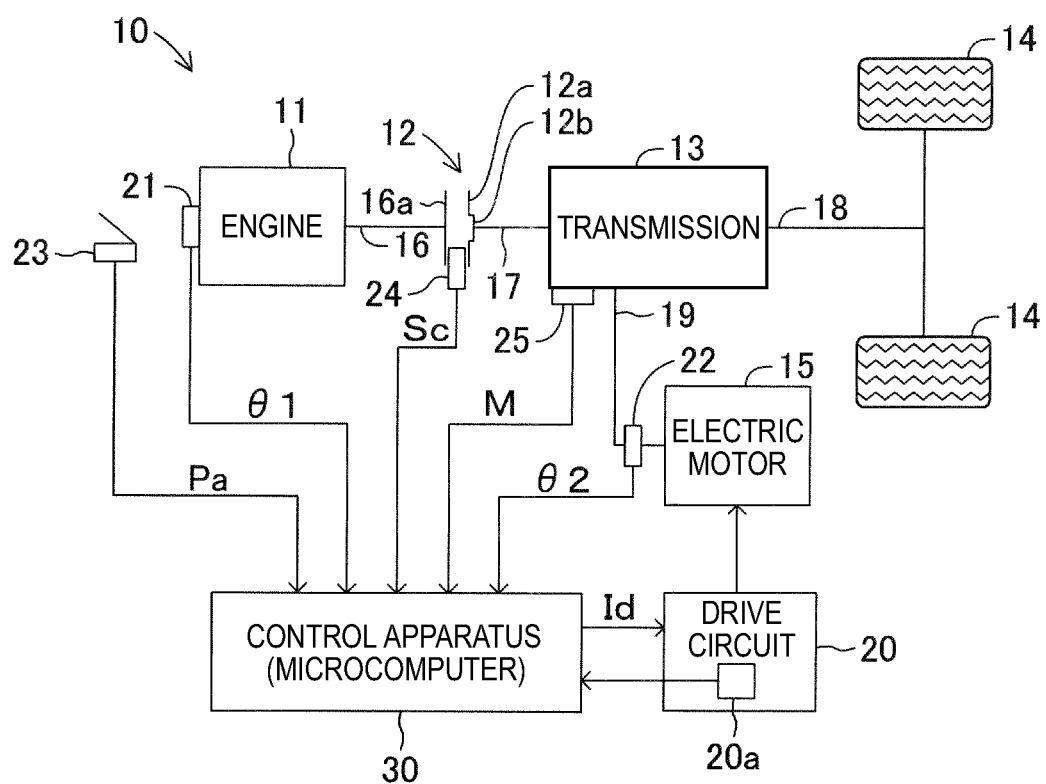
FIG. 1 is a block diagram schematically illustrating a configuration of a vehicle according to an embodiment.

As illustrated in FIG. 1, a vehicle 10 of the present embodiment includes an engine 11 as a drive source, a clutch/damper 12, a transmission 13, wheels 14, and an electric motor 15 as a drive source. The engine 11 is a multi-cylinder internal combustion engine having a plurality of cylinders and pistons, and generates power (engine torque) using, for example, gasoline or light oil as a fuel. The engine 11 includes a crankshaft 16 as an output shaft that outputs an engine torque. The crankshaft 16 is connected to the clutch/damper 12 via a flywheel 16a, which rotates integrally with the crankshaft 16.

The clutch/damper 12 includes an annular clutch unit 12a and an annular torsion damper unit 12b connected to the inner periphery of the clutch unit 12a. The clutch unit 12a is adapted to be sandwiched and supported between the flywheel 16a and a pressure plate (not illustrated) of a clutch cover fixed to the flywheel 16a. The clutch unit 12a transmits the engine torque to an input shaft 17 of the transmission 13 by frictionally engaging with the flywheel 16a, and blocks the transmission of the engine torque to the input shaft 17 (the transmission 13) by releasing the frictional engagement with the flywheel 16a. That is, the clutch unit 12a connects and disconnects the crankshaft 16 of the engine 11 and the input shaft 17 of the transmission 13.

The torsion damper unit 12b is connected to the input shaft 17 of the transmission 13 on the inner periphery thereof. The torsion damper unit 12b is a known torsion damper including an outer plate (not illustrated), which rotates integrally with the clutch unit 12a (that is, the flywheel 16a and the crankshaft 16), an inner plate (not illustrated), which rotates integrally with the input shaft 17, a thrust member (not illustrated), which is fixed to the inner plate and slides on the outer plate, and a plurality of compression coil springs (not illustrated) equidistantly arranged in the circumferential direction so as to connect the outer plate and the inner plate to each other.

In the torsion damper unit 12b, the inner plate rotates relative to the outer plate when the clutch unit 12a is frictionally engaged (that is, when transmitting the engine torque in a connected state). Thereby, the torsion damper unit 12b allows relative rotation of the input shaft 17 relative to the crankshaft 16.

In the torsion damper unit 12b, when the crankshaft 16 and the input shaft 17 rotate relative to each other, the thrust member slides on the outer plate in the circumferential direction, and the compression coil springs are elastically deformed in the circumferential direction. Thereby, the torsion damper unit 12b suppresses the torque fluctuation (torsional vibration) input from the engine 11 side by a frictional force generated by the thrust member and an elastic force generated by the expansion and contraction of the compression coil springs. Then, the torsion damper unit 12b transmits an engine torque (hereinafter also referred to as "damper torque"), in which the torque fluctuation is attenuated, to the input shaft 17.

Here, in a case where a relative angle difference is generated between the crankshaft 16 and the input shaft 17 due to relative rotation, the torsion damper unit 12b causes torsional deformation in the circumferential direction. In this case, due to the frictional force generated by the thrust member and the elastic force generated by the compression coil springs, the torsion damper unit 12b generates a torque Tdamp (hereinafter, this torque being referred to as a "torsion torque Tdamp") according to the torsional deformation. Thus, the damper torque transmitted to the input shaft 17 includes the torsion torque Tdamp. In addition, as will be described later, the torsion torque Tdamp is calculated by multiplying a damper stiffness K, which is preset with respect to the torsional direction of the torsion damper unit 12b, by the relative angle difference between the crankshaft 16 and the input shaft 17.

The transmission 13 includes the input shaft 17 and a drive shaft 18. The transmission 13 is a well-known stepped transmission (e.g., an automatic transmission or a manual transmission) having a plurality of (e.g., six) forward gear positions, one reverse gear position, and a neutral gear position. The gear positions of the transmission 13 are switched in response to an operation of a shift lever (not illustrated), for example. Specifically, the gear positions of the transmission 13 are formed by changing a speed change ratio (the ratio of the rotational speed of the input shaft 17 to the rotational speed of the drive shaft 18).

The driving of the electric motor 15 is controlled by a control apparatus 30 to be described later. In the present embodiment, the electric motor 15 is directly connected to the transmission 13, among the input shaft 17, the transmission 13, and the drive shaft 18, via a motor shaft 19. The electric motor 15 is connected to the control apparatus 30 via a drive circuit 20.

In the vehicle 10, the transmission 13 outputs the damper torque input via the input shaft 17 and the power (motor torque) of the electric motor 15 input via the motor shaft 19 to the drive shaft 18. The drive shaft 18 transmits the damper torque and the motor torque to the wheels 14 via a differential (not illustrated), for example. In addition, in the following description, the crankshaft 16, the clutch/damper 12, the input shaft 17, the transmission 13, the drive shaft 18, and the motor shaft 19, which transmit the power (engine torque) of the engine 11 to the wheels 14, are collectively referred to as a "power train".

In addition, the vehicle 10 includes a crank angle sensor 21, a motor rotation angle sensor 22, an accelerator position sensor 23, a stroke sensor 24, and a shift position sensor 25. The crank angle sensor 21 is provided on the engine 11. The crank angle sensor 21 detects a crank angle $\theta 1$ that indicates the rotation angle of the crankshaft 16, and outputs the crank angle $\theta 1$ to the control apparatus 30. The motor rotation angle sensor 22 is provided on the electric motor 15 (more specifically, the motor shaft 19). The motor rotation angle sensor 22 detects a motor rotation angle $\theta 2$ that indicates the rotation angle of the electric motor 15, and outputs the motor rotation angle $\theta 2$ to the control apparatus 30.

The accelerator position sensor 23 is provided on an accelerator. The accelerator position sensor 23 detects an accelerator opening degree Pa that indicates the opening degree of the accelerator, and outputs the accelerator opening degree Pa to the control apparatus 30. The stroke sensor 24 is provided on the clutch/damper 12. The stroke sensor 24 detects a clutch stroke amount Sc that indicates a position directed to the direction in which the clutch unit 12a is connected to the flywheel 16a (a position in the axial direction of the crankshaft 16), and outputs the clutch stroke amount Sc to the control apparatus 30. The shift position sensor 25 is provided on the transmission 13. The shift position sensor 25 detects a shift position M that indicates the gear position of the transmission 13, and outputs the shift position M to the control apparatus 30.

The control apparatus 30 applied to the vehicle 10 includes a microcomputer having a CPU, a ROM, a RAM, an input/output interface, and a timer, for example, as a main component. The control apparatus 30 controls the driving of the electric motor 15 via the drive circuit 20 based on detection values detected by the respective sensors 21 to 25.

By the way, the damper torque including the torsion torque Tdamp is input from the clutch/damper 12 to the power train. In addition, the electric motor 15 is directly connected to the transmission 13 via the motor shaft 19. Thus, a motor torque Tmg, which includes, for example, a viscous torque component or an inertia torque component, generated according to rotation, is input from the electric motor 15 to the power train. When the torsion torque Tdamp and the motor torque Tmg are transmitted to the power train, vibration is generated in the power train.

Figure 2:
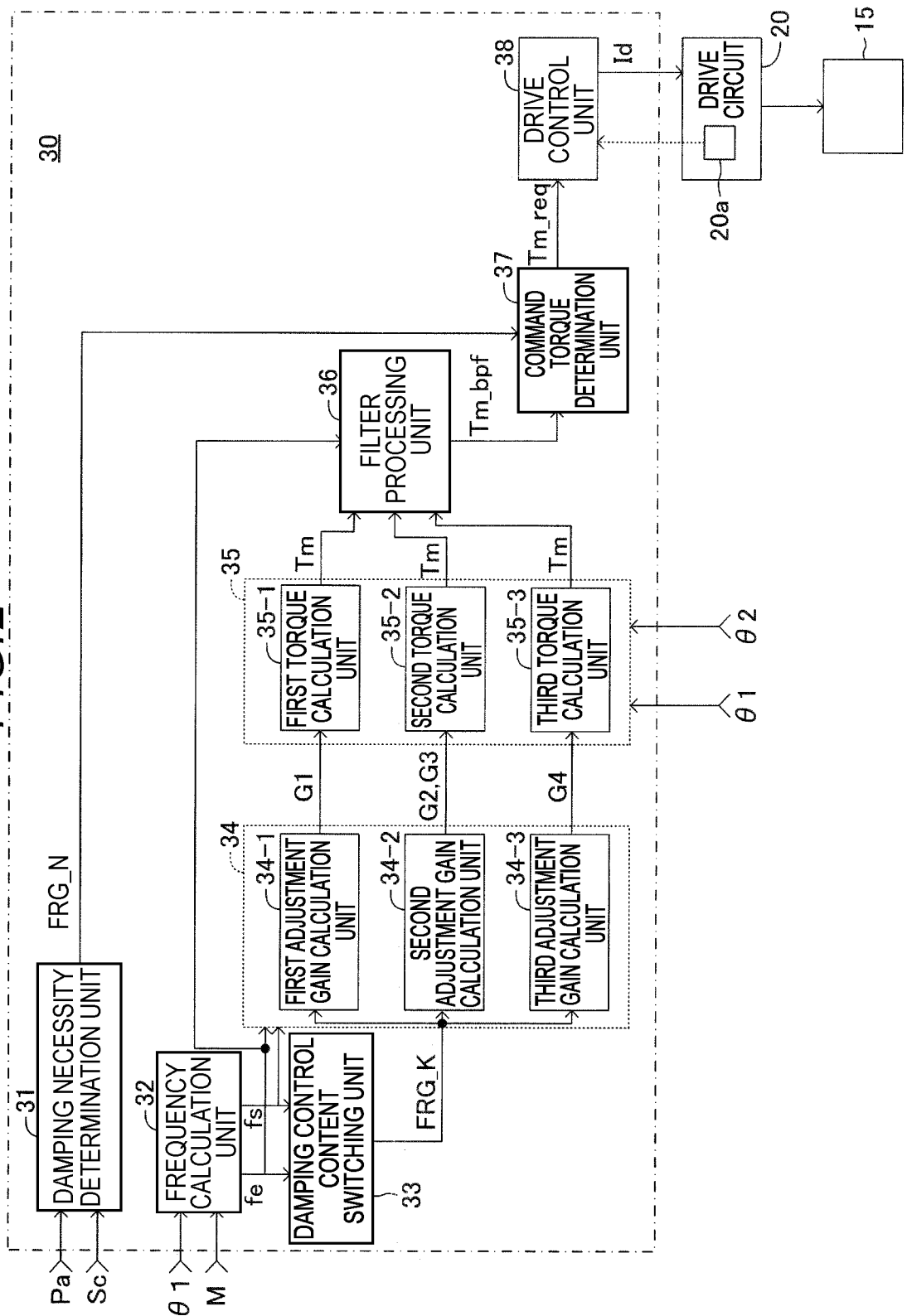
FIG. 2 is a functional block diagram schematically illustrating a configuration of a control apparatus in FIG. 1.

Thus, the control apparatus 30 controls the driving of the electric motor 15 so as to suppress the vibration generated in (transmitted to) the power train. As illustrated in FIG. 2, the control apparatus 30 includes a damping necessity determination unit 31, a frequency calculation unit 32, a damping control content switching unit 33, a gain calculation unit 34, a torque calculation unit 35, a filter processing unit 36, a command torque determination unit 37, and a drive control unit 38. Then, in the control apparatus 30, the gain calculation unit 34 includes a first adjustment gain calculation unit 34-1, a second adjustment gain calculation unit 34-2, and a third adjustment gain calculation unit 34-3. In addition, in the control apparatus 30, the torque calculation unit 35 includes a first torque calculation unit 35-1, a second torque calculation unit 35-2, and a third torque calculation unit 35-3.

The damping necessity determination unit 31 determines whether or not to suppress the vibration caused by the damper torque, which is input (transmitted) to the power train after the input shaft 17 from the engine 11 side via the clutch/damper 12. Specifically, the accelerator opening degree Pa from the accelerator position sensor 23 and the clutch stroke amount Sc from the stroke sensor 24 are input to the damping necessity determination unit 31.

Then, when the accelerator opening degree Pa is "0" that indicates a state where the accelerator is not operated, or when the clutch stroke amount Sc is equal to or less than a predetermined value Sc0 that indicates a state where the clutch unit 12a is separated from the flywheel 16a, the damper torque is not input to the power train after the input shaft 17. Therefore, the damping necessity determination unit 31 sets the value of a necessity determination flag FRG_N that indicates the necessity of damping control to "0" that indicates that damping control is unnecessary.

On the other hand, when the accelerator opening degree Pa is not "0" and when the clutch stroke amount Sc is greater than the predetermined value Sc0, the damping necessity determination unit 31 inputs the damper torque to the power train. Therefore, the damping necessity determination unit 31 sets the value of the necessity determination flag FRG_N to "1" that indicates that damping control is necessary. The damping necessity determination unit 31 outputs the necessity determination flag FRG_N, the value of which is set to "0" or "1", to the command torque determination unit 37.

The frequency calculation unit 32 calculates an engine pulsation frequency fe of the torque pulsation, which is generated in the engine 11 in proportion to a rotational speed Ne of the engine 11 in association with the torque fluctuation of the engine torque. In addition, the frequency calculation unit 32 calculates a damper resonance frequency fs, at which the periodic relative rotation between the crankshaft 16 and the input shaft 17 depending on the torque pulsation resonates with the torsion in the torsion damper unit 12b in the circumferential direction.

As described above, since the engine 11 is a four-cycle (stroke) gasoline engine, combustion occurs once in a specific cylinder while the crankshaft 16 makes two revolutions. For example, when the engine 11 is a four-cylinder gasoline engine, combustion occurs in one of the cylinders while the crankshaft 16 rotates by 180°. When combustion occurs in the cylinder, a force to depress a piston is generated, and this force is converted into a torque that rotates the crankshaft 16. Thus, the engine pulsation frequency fe is proportional to the rotational speed Ne of the engine 11 (hereinafter referred to as an "engine rotational speed Ne") and the number of cylinders n of the engine 11, and is inversely proportional to the number of cycles c of the engine 11.

Therefore, the frequency calculation unit 32 receives the crank angle θ1 input in succession from the crank angle sensor 21, and calculates the engine rotational speed Ne based on variation in the crank angle θ1. Then, the frequency calculation unit 32 calculates the engine pulsation frequency fe according to the following Equation 1.

$$Fe = \frac{Ne \times n}{60 \times c} \qquad \text{Equation 1}$$

In addition, in the above Equation 1, "Ne" is the engine rotational speed calculated from the crank angle θ1, "n" is the number of cylinders of the engine 11 (e.g., n=4), and "c" is the number of cycles of the engine 11 (e.g., c=2). The frequency calculation unit 32 outputs the calculated engine pulsation frequency fe to the damping control content switching unit 33.

Figure 3:
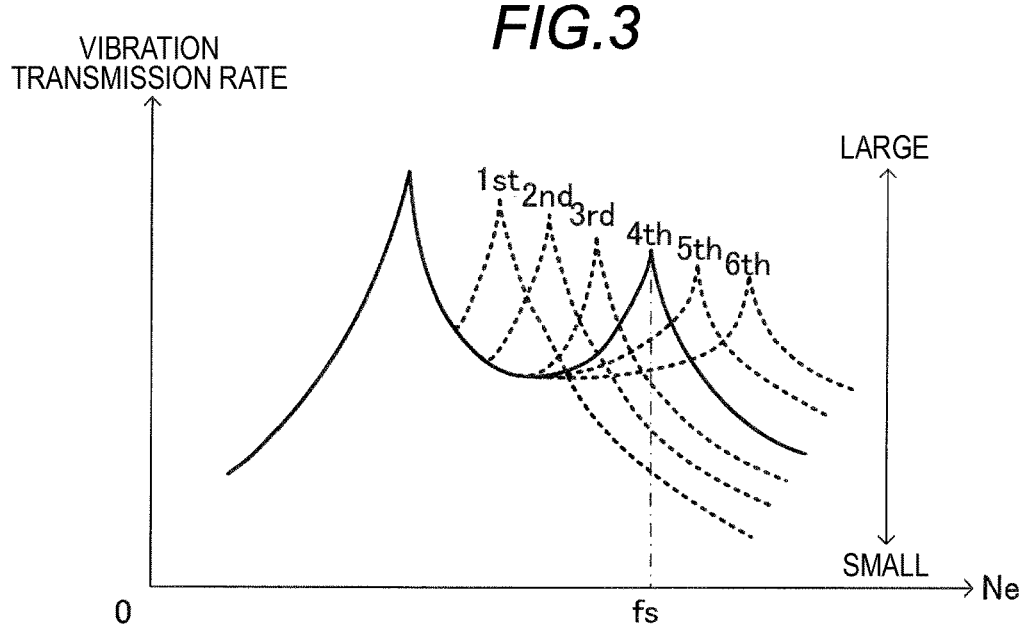
FIG. 3 is a graph illustrating a relationship between the rotational speed of an engine (the shift position of a transmission) and a vibration transmission rate (damper resonance frequency)

The torsion damper unit 12b of the clutch/damper 12 is connected to the transmission 13 via the input shaft 17. In this case, as illustrated in FIG. 3, the damper resonance frequency fs of the torsion damper unit 12b corresponds to the extreme value (maximum value) of the vibration transmission rate of the vibration (ease in the transmission of vibration) transmitted from the torsion damper unit 12b to the transmission 13 via the input shaft 17, with respect to variation in the engine rotational speed Ne.

Here, the damper resonance frequency fs (the maximum value of the vibration transmission rate) varies depending on the engine rotational speed Ne, and therefore varies depending on the gear position of the transmission 13, that is, the shift position M. Specifically, the damper resonance frequency fs (the maximum value of the vibration transmission rate) moves toward the high rotational speed side of the engine rotational speed Ne as the shift position M approaches the higher speed side (higher stage), and the damper resonance frequency fs (the maximum value of the vibration transmission rate) moves toward the low rotational speed side of the engine rotational speed Ne as the shift position M approaches the lower speed side (lower stage). Therefore, the frequency calculation unit 32 receives the shift position M input from the shift position sensor 25, and calculates the damper resonance frequency fs (=F(M)) of the clutch/damper 12 with reference to the shift position-vibration transmission rate map illustrated in FIG. 3 using the input shift position M. The frequency calculation unit 32 outputs the calculated damper resonance frequency fs to the damping control content switching unit 33.

The damping control content switching unit 33 switches a torque command Tm, which is generated by the electric motor 15 to suppress the vibration generated in the power train, according to the engine pulsation frequency fe with respect to the damper resonance frequency fs calculated by the frequency calculation unit 32. More specifically, the damping control content switching unit 33 determines a case where the engine pulsation frequency fe is less than a first frequency f1(=Fs−X) obtained by subtracting a preset first predetermined positive value X from the damper resonance frequency fs, a case where the engine pulsation frequency fe is equal to or greater than the first frequency f1 (equal to or greater than the first frequency) and is also equal to or less than a second frequency f2 obtained by adding a preset second predetermined positive value Y to the damper resonance frequency fs (equal to or less than the second frequency), and a case where the engine pulsation frequency fe is greater than the second frequency f2. Then, based on the determined result, the damping control content switching unit 33 switches damping control content that drives the electric motor 15 in order to suppress the vibration generated in the power train.

When the engine pulsation frequency fe is less than the first frequency f1, the damping control content switching unit 33 performs switching to control content in which the first adjustment gain calculation unit 34-1 and the first torque calculation unit 35-1 calculate the torque command Tm (hereinafter, this control content being referred to as "control A"). In addition, when the engine pulsation frequency fe is equal to or greater than the first frequency f1 (equal to or greater than the first frequency) and is also equal to or less than the second frequency f2 (equal to or less than the second frequency), the damping control content switching unit 33 performs switching to control content in which the second adjustment gain calculation unit 34-2 and the second torque calculation unit 35-2 calculate the torque command Tm (hereinafter, this control content being referred to as "control B"). In addition, when the engine pulsation frequency fe is greater than the second frequency f2, the damping control content switching unit 33 performs switching to control content in which the third adjustment gain calculation unit 34-3 and the third torque calculation unit 35-3 calculate the torque command Tm (hereinafter, this control content being referred to as "control C").

Therefore, when the engine pulsation frequency fe is less than the first frequency f1, the damping control content switching unit 33 sets the value of a switching flag FRG_K that indicates the switching of a calculated torque to "1" that indicates the control A. In addition, when the engine pulsation frequency fe is equal to or greater than the first frequency f1 and is also equal to or less than the second frequency f2, the damping control content switching unit 33 sets the value of the switching flag FRG_K to "2" that indicates the control B. In addition, when the engine pulsation frequency fe is greater than the second frequency f2, the damping control content switching unit 33 sets the value of the switching flag FRG_K to "3" that indicates the control C. The damping control content switching unit 33 outputs the switching flag FRG_K, the value of which is set to "1", "2" or "3", to the first adjustment gain calculation unit 34-1, the second adjustment gain calculation unit 34-2, and the third adjustment gain calculation unit 34-3.

Next, the first adjustment gain calculation unit 34-1, the second adjustment gain calculation unit 34-2, and the third adjustment gain calculation unit 34-3, which constitute the gain calculation unit 34, will be described.

As described above, the torsion torque Tdamp is a torque that is generated due to the torsion generated in the torsion damper unit 12b by the relative rotation occurring between the crankshaft 16 and the input shaft 17. The crankshaft 16 and the input shaft 17 are connected to each other via the torsion damper unit 12b.

Therefore, the relative rotation between the crankshaft 16 and the input shaft 17 increases when the engine pulsation frequency fe is equal to or greater than the first frequency f1, in particular, when the engine pulsation frequency fe varies so as to coincide with the damper resonance frequency fs, that is, in the control B and the control C. On the other hand, the relative rotation between the crankshaft 16 and the input shaft 17 decreases in the control A, which is executed when the engine pulsation frequency fe is less than the first frequency f1.

On the other hand, for example, the viscous torque component or the inertia torque component, included in the motor torque Tmg, decrease as a rotational speed Nm of the electric motor 15 (hereinafter referred to as a "motor rotational speed Nm") increases. The electric motor 15 is connected to the transmission 13 via the motor shaft 19, and the transmission 13 is connected to the crankshaft 16, that is, the engine 11 via the input shaft 17 and the clutch/damper 12.

Accordingly, a damper torque that pulsates at the engine pulsation frequency fe is transmitted to the electric motor 15. When the damper torque is transmitted to the electric motor 15 in the control A in which the engine pulsation frequency fe is less than the first frequency f1, the electric motor 15 rotates at a relatively low motor rotational speed Nm. Therefore, for example, the viscous torque component or the inertia torque component, included in the motor torque Tmg of the electric motor 15, increases. On the other hand, when the damper torque is transmitted to the electric motor 15 in the control B and the control C, the electric motor 15 rotates at a relatively high motor rotational speed Nm. Therefore, for example, the viscous torque component or the inertia torque component, included in the motor torque Tmg of the electric motor 15, decreases.

As described above, the torsion torque Tdamp and the motor torque Tmg (more specifically, for example, the viscous torque component or the inertia torque component), the magnitude of which varies depending on the engine pulsation frequency fe, generate unnecessary vibration in the power train after the input shaft 17. Thus, each of the first adjustment gain calculation unit 34-1 to the third adjustment gain calculation unit 34-3 calculates any one gain among a first gain G1, a second gain G2, a third gain G3, and a fourth gain G4 in order to allow the first torque calculation unit 35-1 to the third torque calculation unit 35-3 to calculate a reverse phase torque command Tm so as to offset the torsion torque Tdamp and/or the motor torque Tmg.

In the control A in which the value of the switching flag FRG_K is set to "1" by the damping control content switching unit 33, the first adjustment gain calculation unit 34-1 calculates the first gain G1 for allowing the first torque calculation unit 35-1 to calculate the torque command Tm based on the following Equation 2. The first gain G1 is a gain that is multiplied by the motor rotational speed Nm of the electric motor 15, which is a motor torque reduction component Te_m that reduces, for example, the viscous torque component or the inertia torque component included in the motor torque Tmg.

Figure 4:
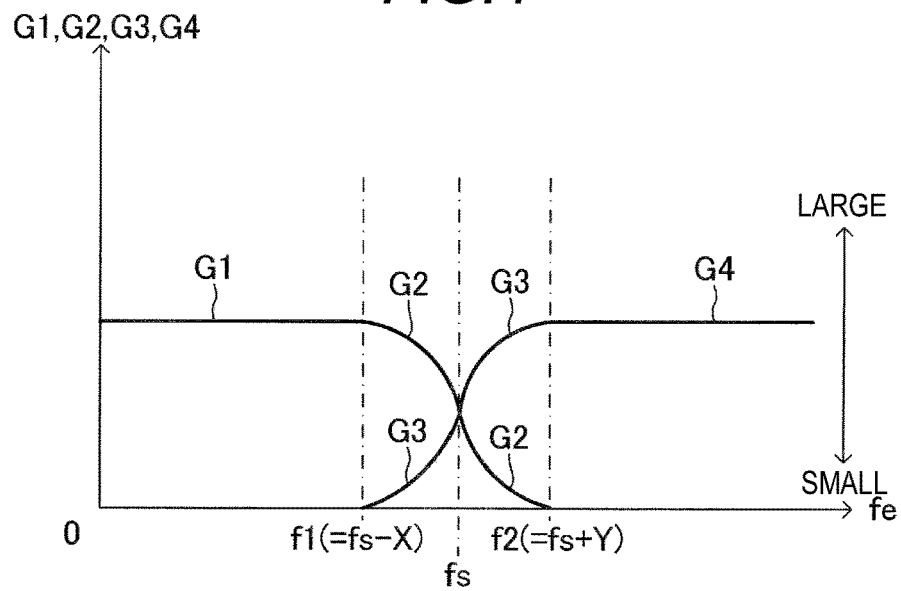
FIG. 4 is a graph illustrating a relationship between an engine pulsation frequency and a first gain and a second gain.

The first adjustment gain calculation unit 34-1 receives the engine pulsation frequency fe and the damper resonance frequency fs input from the frequency calculation unit 32. The first adjustment gain calculation unit 34-1 calculates the first gain G1, which corresponds to the engine pulsation frequency fe, with reference to the engine pulsation frequency-gain map illustrated in FIG. 4 using the engine pulsation frequency fe and the damper resonance frequency fs input thereto. The first adjustment gain calculation unit 34-1 outputs the calculated first gain G1 to the first torque calculation unit 35-1. Here, as illustrated in FIG. 4, the first gain G1 is constant with respect to variation in the engine pulsation frequency fe in the frequency band that is less than the first frequency f1. Thereby, when the engine pulsation frequency fe coincides with the first frequency f1, the first gain G1 becomes the minimum value. However, the first gain G1 is a value that satisfies G1>0.

In the control B in which the value of the switching flag FRG_K is set to "2" by the damping control content switching unit 33, the second adjustment gain calculation unit 34-2 calculates the second gain G2 and the third gain G3 for allowing the second torque calculation unit 35-2 to calculate the torque command Tm based on the following Equation 3. The second gain G2 is a gain that is multiplied by the motor rotational speed Nm of the electric motor 15, which is the motor torque reduction component Te_m, and the third gain G3 is a gain that is multiplied by a torsion torque reduction component Te_d, which reduces the torsion torque Tdamp of the torsion damper unit 12b.

The second adjustment gain calculation unit 34-2 receives the engine pulsation frequency fe and the damper resonance frequency fs input from the frequency calculation unit 32. The second adjustment gain calculation unit 34-2 calculates the second gain G2 and the third gain G3, which correspond to the engine pulsation frequency fe, with reference to the engine pulsation frequency-gain map illustrated in FIG. 4 using the engine pulsation frequency fe and the damper resonance frequency fs input thereto. The second adjustment gain calculation unit 34-2 outputs the calculated second gain G2 and third gain G3 to the second torque calculation unit 35-2.

Here, as illustrated in FIG. 4, the second gain G2 varies from the magnitude of the first gain G1 to "0" as the engine pulsation frequency fe increases in the frequency band that is equal to or greater than the first frequency f1 and is also equal to or less than the second frequency f2. That is, the second gain G2 is a value that satisfies 0≤G2≤G1. On the other hand, as illustrated in FIG. 4, the third gain G3 varies from "0" to the magnitude of the fourth gain G4 to be described later as the engine pulsation frequency fe increases in the frequency band that is equal to or greater than the first frequency f1 and is also equal to or less than the second frequency f2. That is, the third gain G3 is a value that satisfies 0≤G3≤G4. In addition, in the present embodiment, the second gain G2 and the third gain G3 are the same value when the engine pulsation frequency fe coincides with the damper resonance frequency fs.

In the control C in which the value of the switching flag FRG_K is set to "3" by the damping control content switching unit 33, the third adjustment gain calculation unit 34-3 calculates the fourth gain G4 for allowing the third torque calculation unit 35-3 to calculate the torque command Tm based on the following Equation 4. The fourth gain G4 is a gain that is multiplied by the torsion torque reduction component Te_d.

The third adjustment gain calculation unit 34-3 receives the engine pulsation frequency fe and the damper resonance frequency fs input from the frequency calculation unit 32. The third adjustment gain calculation unit 34-3 calculates the fourth gain G4, which corresponds to the engine pulsation frequency fe, with reference to the engine pulsation frequency-gain map illustrated in FIG. 4 using the engine pulsation frequency fe and the damper resonance frequency fs input thereto. The third adjustment gain calculation unit 34-3 outputs the calculated fourth gain G4 to the third torque calculation unit 35-3. Here, as illustrated in FIG. 4, the fourth gain G4 is constant with respect to variation in the engine pulsation frequency fe in the frequency band that is greater than the second frequency f2. Thereby, when the engine pulsation frequency fe coincides with the second frequency f2, the fourth gain G4 becomes the maximum value. However, the fourth gain G4 is a value that satisfies G4>0.

Next, the first torque calculation unit 35-1, the second torque calculation unit 35-2, and the third torque calculation unit 35-3, which constitute the torque calculation unit 35, will be described.

The first torque calculation unit 35-1 receives the motor rotation angle θ2 input from the motor rotation angle sensor 22, and calculates the motor rotational speed Nm based on variation in the motor rotation angle θ2. Then, the first torque calculation unit 35-1 calculates the torque command Tm for driving the electric motor 15 so as to suppress the vibration generated in the power train after the input shaft 17 according to the following Equation 2 using the first gain G1 and the motor rotational speed Nm, that is, the motor torque reduction component Te_m.

$$Tm = -G1 \times Nm \quad \text{Equation 2}$$

When the electric motor 15 outputs a torque corresponding to the torque command Tm calculated according to the above Equation 2, the motor torque reduction component Te_m having a reverse phase with respect to the motor torque Tmg, which is input to the transmission 13 according to the rotation of the electric motor 15, acts. The first torque calculation unit 35-1 outputs the calculated torque command Tm to the filter processing unit 36.

The second torque calculation unit 35-2 receives the crank angle θ1 input from the crank angle sensor 21, and also receives the motor rotation angle θ2 input from the motor rotation angle sensor 22. The second torque calculation unit 35-2 calculates the motor rotational speed Nm based on variation in the input motor rotation angle θ2. Then, the second torque calculation unit 35-2 calculates the torque command Tm according to the following Equation 3 using the second gain G2, the motor rotational speed Nm, that is, the motor torque reduction component Te_m, the third gain G3, the crank angle θ1, and the motor rotation angle θ2.

$$Tm = -G2 \times Nm - G3 \times K \times (\theta1 - \theta2) \quad \text{Equation 3}$$

In the above Equation 3, "K" is the damper stiffness when the torsion damper unit 12b is elastically deformed in the torsional direction.

In the above Equation 3, the first term on the right side acts as the motor torque reduction component Te_m having a reverse phase with respect to the motor torque Tmg input to the transmission 13 according to the rotation of the electric motor 15, and the second term on the right side acts as the torsion torque reduction component Te_d having a reverse phase with respect to the torsion torque Tdamp input to the transmission 13 according to the torsion of the torsion damper unit 12b. That is, the torque command Tm in the control B is calculated by summing up the value of the motor torque reduction component and the value of the torsion torque reduction component. Thus, the torque, which is output from the electric motor 15 in response to the torque command Tm calculated according to the above-described Equation 3, acts as a reverse phase with respect to the motor torque Tmg, and also acts as a reverse phase with respect to the torsion torque Tdamp. The second torque calculation unit 35-2 outputs the calculated torque command Tm to the filter processing unit 36.

The third torque calculation unit 35-3 receives the crank angle θ1 input from the crank angle sensor 21 and the motor rotation angle θ2 input from the motor rotation angle sensor 22. Then, the third torque calculation unit 35-3 calculates the torque command Tm according to the following Equation 4 using the fourth gain G4, the crank angle θ1, and the motor rotation angle θ2.

$$Tm = -G4 \times K \times (\theta1 - \theta2) \quad \text{Equation 4}$$

In the above Equation 4, "K" is the damper stiffness when the torsion damper unit 12b is elastically deformed in the torsional direction. The torque, which is output from the electric motor 15 in response to the torque command Tm calculated according to the above Equation 4, acts as the torsion torque reduction component Te_d having a reverse phase with respect to the torsion torque Tdamp input to the transmission 13 according to the torsion of the torsion damper unit 12b. The third torque calculation unit 35-3 outputs the calculated torque command Tm to the filter processing unit 36.

The filter processing unit 36 performs a band pass filter processing on the torque command Tm calculated by the first torque calculation unit 35-1, the second torque calculation unit 35-2, or the third torque calculation unit 35-3. Specifically, the filter processing unit 36 receives the engine pulsation frequency fe input from the frequency calculation unit 32, and sets a band pass filter F(s) having a pass band (frequency band) that passes the engine pulsation frequency fe. The filter processing unit 36 receives the torque command Tm calculated by the first torque calculation unit 35-1, the second torque calculation unit 35-2, or the third torque calculation unit 35-3 input thereto, and performs the band pass filter processing by multiplying the input torque command Tm by the band pass filter F(s). Then, the filter processing unit 36 outputs a post-filter torque command Tm_bpf (=Tm×F(s)), obtained by performing the band pass filter processing on the torque command Tm, to the command torque determination unit 37.

Here, the torque command Tm calculated by the first torque calculation unit 35-1 in the control A, the torque command Tm calculated by the second torque calculation unit 35-2 in the control B, and the torque command Tm calculated by the third torque calculation unit 35-3 include, in addition to the engine pulsation frequency fe component, a frequency component (e.g., a frequency component lower than the damper resonance frequency fs) required for the engine 11 to accelerate and decelerate the vehicle 10. The torque command Tm is a torque generated by the electric motor 15 in order to control the vibration generated in the power train. Thus, the filter processing unit 36 performs a band pass filter processing on the torque command Tm calculated in the control A, the control B, or the control C to generate the post-filter torque command Tm_bpf. Thereby, the vibration generated in the power train is suppressed without attenuation of the frequency component required for the engine 11 to accelerate and decelerate the vehicle 10.

The command torque determination unit 37 determines a damping control torque command Tm_req to be generated by the electric motor 15 according to the determined result by the damping necessity determination unit 31. That is, the command torque determination unit 37 determines that the damping control torque command Tm_req is "0" since no vibration is generated in the power train and damping control is unnecessary when the value of the necessity determination flag FRG_N input from the damping necessity determination unit 31 is "0". Then, the command torque determination unit 37 outputs the damping control torque command Tm_req, which is determined to be "0", to the drive control unit 38.

On the other hand, when the value of the necessity determination flag FRG_N from the damping necessity determination unit 31 is "1", vibration is generated in the power train and damping control is necessary. Therefore, the command torque determination unit 37 determines the damping control torque command Tm_req by processing the post-filter torque command Tm_bpf, input from the filter processing unit 36, so as to fall within the range of upper and lower limit values determined by the performance of the electric motor 15 and a preset damping performance target.

Figure 5:
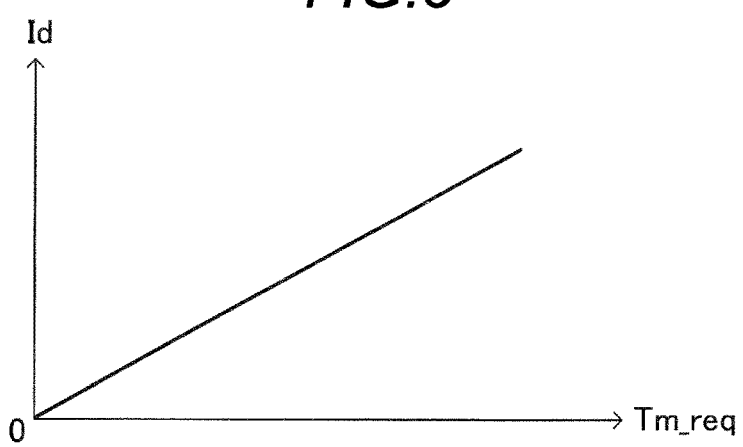
FIG. 5 is a graph illustrating a relationship between a damping control torque command and a target current value.

The drive control unit 38 determines a target current value Id to be supplied to the electric motor 15 with reference to the damping control torque command-target current value map illustrated in FIG. 5 using the damping control torque command Tm_req input from the command torque determination unit 37. The target current value Id is determined to be "0" when the damping control torque command Tm_req is "0", and is determined so as to increase as the damping control torque command Tm_req increases.

The drive control unit 38 controls the drive circuit 20 based on the determined target current value Id. In this case, the drive control unit 38 receives the feedback value of current flowing from a current detector 20a provided in the drive circuit 20 to the electric motor 15, and controls the drive circuit 20 so that the current of the target current value Id flows to the electric motor 15. Thereby, the electric motor 15 outputs a damping control torque Tv depending on the damping control torque command Tm_req to the transmission 13, that is, the power train via the motor shaft 19. In addition, for example, when a driving torque depending on the accelerator opening degree Pa is determined and the electric motor 15 is driven to drive the vehicle 10, the drive control unit 38 may drive the electric motor 15 so as to generate the driving torque, in addition to the damping control torque Tv depending on the damping control torque command Tm_req.

Figure 6:
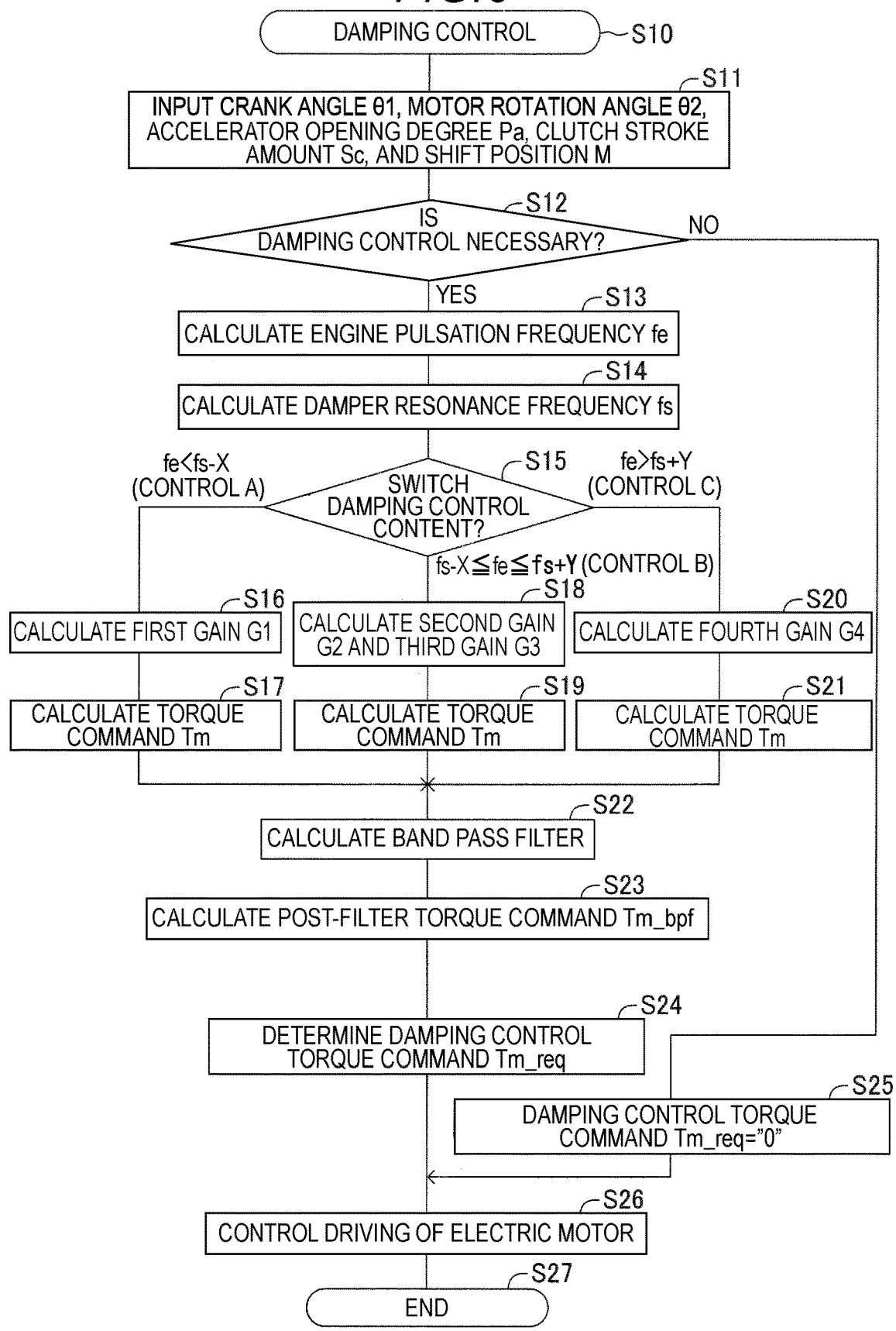
FIG. 6 is a flowchart of a damping control program executed by the control apparatus.

Next, an operation of the above-described control apparatus 30 will be described with reference to the flowchart of a "damping control program" illustrated in FIG. 6. The "damping control program" is executed by the CPU constituting the control apparatus 30 (microcomputer). In addition, the "damping control program" is stored in advance in the ROM constituting the control apparatus 30 (microcomputer). The control apparatus 30 repeatedly initiates the execution of the "damping control program" in step S10 whenever a predetermined short time passes.

When the execution of the "damping control program" is initiated in step S10, the control apparatus 30 (more specifically, the CPU) receives detected values input respectively from the crank angle sensor 21, the motor rotation angle sensor 22, the accelerator position sensor 23, the stroke sensor 24, and the shift position sensor 25 in step S11. When the crank angle θ1, the motor rotation angle θ2, the accelerator opening degree Pa, the clutch stroke amount Sc, and the shift position M are input from the respective sensors 21 to 25, the control apparatus 30 proceeds to step S12.

In step S12, the control apparatus 30 (the damping necessity determination unit 31) determines whether or not damping control for the power train is necessary based on the accelerator opening degree Pa and the clutch stroke amount Sc input in step S11. Specifically, when the accelerator opening degree Pa is not "0" and the clutch stroke amount Sc is greater than the predetermined value Sc0, since the damper torque is input and damping control is necessary, the control apparatus 30 determines "Yes", and proceeds to step S13. On the other hand, when the accelerator opening degree Pa is "0" or when the clutch stroke amount Sc is equal to or less than the predetermined value Sc0, since the damper torque is not input and the damping control is unnecessary, the control apparatus 30 determines "No", and proceeds to step S25. In addition, in step S25, the control apparatus 30 sets the damping control torque command Tm_req to zero ("0").

In step S13, the control apparatus 30 (the frequency calculation unit 32) calculates the engine pulsation frequency fe. That is, the control apparatus 30 calculates the engine rotational speed Ne based on the crank angle θ1 input in step S11. Then, the control apparatus 30 calculates the engine pulsation frequency fe according to the above Equation 1 using the engine rotational speed Ne, and proceeds to step S14.

In step S14, the control apparatus 30 (the frequency calculation unit 32) calculates the damper resonance frequency fs. That is, the control apparatus 30 calculates the damper resonance frequency fs corresponding to the shift position M input in step S11. In this case, the control apparatus 30 calculates the damper resonance frequency fs with reference to the shift position-vibration transmission rate map illustrated in FIG. 3 using the input shift position M. Then, after calculating the damper resonance frequency fs, the control apparatus 30 proceeds to step S15.

In step S15, the control apparatus 30 (the damping control content switching unit 33) performs switching from the torque command Tm to be calculated to the torque command Tm of the control A, to the torque command Tm of the control B, or to the torque command Tm of the control C according to the engine pulsation frequency fe. In this case, the control apparatus 30 switches the torque command Tm to be calculated using the engine pulsation frequency fe calculated in step S13 and the damper resonance frequency fs calculated in step S14.

Specifically, when the engine pulsation frequency fe is less than the first frequency f1 (=fs−X) obtained by subtracting the first predetermined positive value X from the damper resonance frequency fs, the control apparatus 30 proceeds to step S16 for calculating the torque command Tm of the control A. In addition, when the engine pulsation frequency fe is equal to or greater than the first frequency f1 and is also equal to or less than the second frequency f2(=fs+Y) obtained by adding the second predetermined positive value Y to the damper resonance frequency fs, the control apparatus 30 proceeds to step S18 for calculating the torque command Tm of the control B. In addition, when the engine pulsation frequency fe is greater than the second frequency f2, the control apparatus 30 proceeds to step S20 for calculating the torque command Tm of the control C.

In accordance with the switching determination in step S15, in a case of the control A, the control apparatus 30 (the first adjustment gain calculation unit 34-1) calculates the first gain G1 in step S16. That is, the control apparatus 30 refers to the engine pulsation frequency-gain map illustrated in FIG. 4 using the engine pulsation frequency fe calculated in step S12 and the damper resonance frequency fs calculated in step S13. Thereby, the control apparatus 30 calculates the first gain G1, which is a constant value with respect to variation in the engine pulsation frequency fe in the frequency band that is smaller than the first frequency f1. Then, after calculating the first gain G1, the control apparatus 30 proceeds to step S17.

In step S17, the control apparatus 30 (the first torque calculation unit 35-1) calculates the torque command Tm in the control A according to the above Equation 2 using the motor rotational speed Nm of the electric motor 15 (i.e., the motor torque reduction component Te_m) calculated from the motor rotation angle 92 input in step S11 and the first gain G1 calculated in step S16. Then, after calculating the torque command Tm in the control A, the control apparatus 30 proceeds to step S22.

In accordance with the switching determination in step S15, in a case of the control B, the control apparatus 30 (the second adjustment gain calculation unit 34-2) calculates the second gain G2 and the third gain G3 in step S18. That is, the control apparatus 30 refers to the engine pulsation frequency-gain map illustrated in FIG. 4 using the engine pulsation frequency fe calculated in step S12 and the damper resonance frequency fs calculated in step S13.

Thereby, the control apparatus 30 calculates the second gain G2, which decreases from the first gain G1 to "0" as the engine pulsation frequency fe increases at the first frequency f1 or more and the second frequency f2 or less. In addition, the control apparatus 30 calculates the third gain G3, which increases from "0" to the magnitude of the fourth gain G4 as the engine pulsation frequency fe increases at the first frequency f1 or more and the second frequency f2 or less. In addition, in the present embodiment, when the engine pulsation frequency fe coincides with the damper resonance frequency fs, the magnitude of the second gain G2 coincides with the magnitude of the third gain G3. Then, after calculating the second gain G2 and the third gain G3, the control apparatus 30 proceeds to step S19.

In step S19, the control apparatus 30 (the second torque calculation unit 35-2) calculates the torque command Tm in the control B according to the above Equation 3 using the torsion torque reduction component Te_d calculated from the crank angle θ1, the motor rotation angle θ2, and the damper stiffness K input in step S11, the motor rotational speed Nm of the electric motor 15 (i.e., the motor torque reduction component Te_m) calculated from the motor rotation angle θ2, and the second gain G2 and the third gain G3 calculated in step S18. Then, after calculating the torque command Tm in the control B, the control apparatus 30 proceeds to step S22.

In accordance with the switching determination in step S15, in a case of the control C, the control apparatus 30 (the third adjustment gain calculation unit 34-3) calculates the fourth gain G4 in step S20. That is, the control apparatus 30 refers to the engine pulsation frequency-gain map illustrated in FIG. 4 using the engine pulsation frequency fe calculated in step S12 and the damper resonance frequency fs calculated in step S13. Thereby, the control apparatus 30 calculates the fourth gain G4, which is a constant value with respect to variation in the engine pulsation frequency fe in the frequency band that is greater than the second frequency f2. Then, after calculating the fourth gain G4, the control apparatus 30 proceeds to step S21.

In step S21, the control apparatus 30 (the third torque calculation unit 35-3) calculates the torque command Tm in the control C according to the above Equation 3 using the torsion torque reduction component Te_d calculated from the crank angle 91, the motor rotation angle θ2, and the damper stiffness K input in step S11 and the fourth gain G4 calculated in step S20. Then, after calculating the torque command Tm in the control C, the control apparatus 30 proceeds to step S22.

After the step processing in step S17, in step S19 or in step S21, the control apparatus 30 (the filter processing unit 36) calculates the band pass filter F(s), which passes the engine pulsation frequency fe, using the engine pulsation frequency fe calculated in step S13, in step S22. Then, after calculating the band pass filter F(s), the control apparatus 30 proceeds to step S23.

In step S23, the control apparatus 30 (the filter processing unit 36) performs a band pass filter processing by multiplying the band pass filter F(s) calculated in step S22 by the torque command Tm in the control A calculated in step S17, the torque command Tm in the control B calculated in step S19, or the torque command Tm in the control C calculated in step S21. Then, after calculating the post-filter torque command Tm_bpf by the band pass filter processing of the torque command Tm in the control A, the torque command Tm in the control B, or the torque command Tm in the control C, the control apparatus 30 proceeds to step S24.

Here, the torque command Tm in the control A, the torque command Tm in the control B, and the torque command Tm in the control C include a frequency component (frequency band) in which the engine 11 accelerates and decelerates the vehicle 10. Thus, the post-filter torque command Tm_bpf, calculated using the band pass filter F(s) that passes the engine pulsation frequency fe, generates a torque in the electric motor 15 so as to suppress the vibration generated in the power train without affecting the acceleration or deceleration of the vehicle 10. After calculating the post-filter torque command Tm_bpf, the control apparatus 30 proceeds to step S24.

In step S24, the control apparatus 30 (the command torque determination unit 37) performs an upper/lower limit processing on the post-filter torque command Tm_bpf calculated in step S23. Then, after determining the damping control torque command Tm_req by the upper/lower limit processing, the control apparatus 30 proceeds to step S26.

When the control apparatus 30 (the damping necessity determination unit 31) determines "No" in step S12, the control apparatus 30 (the command torque determination unit 37) executes the step processing of step S25. In step S25, the control apparatus 30 determines the damping control torque command Tm_req to be zero ("0"). After determining that the damping control torque command Tm_req is "0", the control apparatus 30 proceeds to step S26.

In step S26, the control apparatus 30 (the drive control unit 38) controls the driving of the electric motor 15 according to the damping control torque command Tm_req determined in step S24 or step S25. That is, the control apparatus 30 determines the target current value Id to be supplied to the electric motor 15 with reference to the damping control torque command-target current value map illustrated in FIG. 5 using the determined damping control torque command Tm_req. In addition, when the damping control torque command Tm_req is determined to be "0" in step S25, the control apparatus 30 determines the target current value Id to be "0".

Then, the control apparatus 30 receives the feedback value of current flowing from the current detector 20a of the drive circuit 20 to the electric motor 15, and controls the drive circuit 20 so that the current of the target current value Id flows to the electric motor 15. Thereby, the electric motor 15 outputs the damping control torque Tv depending on the damping control torque command Tm_req to the power train.

After controlling the drive of the electric motor 15 in step S26, the control apparatus 30 proceeds to step S27. Then, the control apparatus 30 temporarily ends the execution of the "damping control program" in step S27, and after a predetermined short time has passed, the control apparatus 30 again initiates the execution of the "damping control program" in step S10.

By the way, the control apparatus 30 determines the damping control torque command Tm_req, and controls the driving of the electric motor 15. Thereby, the electric motor 15 inputs the damping control torque Tv depending on the damping control torque command Tm_req to the power train, thereby suppressing the vibration generated in the power train.

As described above, when the engine pulsation frequency fe is lower than the first frequency f1(=fs−X), since the relative rotation between the crankshaft 16 and the input shaft 17 decreases, the torsion torque Tdamp of the clutch/damper 12 decreases. On the other hand, when the engine pulsation frequency fe is lower than the first frequency f1, the electric motor 15, which is directly connected to the transmission 13 via the motor shaft 19, rotates at a relatively low rotational speed. Therefore, the motor torque Tmg (including the viscous torque component or the inertia torque component) generated according to the rotation of the electric motor 15 increases. Thus, when the engine pulsation frequency fe is lower than the first frequency f1, the vibration caused mainly by the motor torque Tmg of the electric motor 15 is generated in the power train.

When the engine pulsation frequency fe is lower than the first frequency f1, in other words, in the control A, the control apparatus 30 calculates the torque command Tm based on the motor rotational speed Nm of the electric motor 15 according to the above Equation 2. Then, the control apparatus 30 determines the damping control torque command Tm_req, and controls the driving of the electric motor 15 based on the damping control torque command Tm_req, so that the electric motor 15 outputs the damping control torque Tv to the power train.

Figure 7:
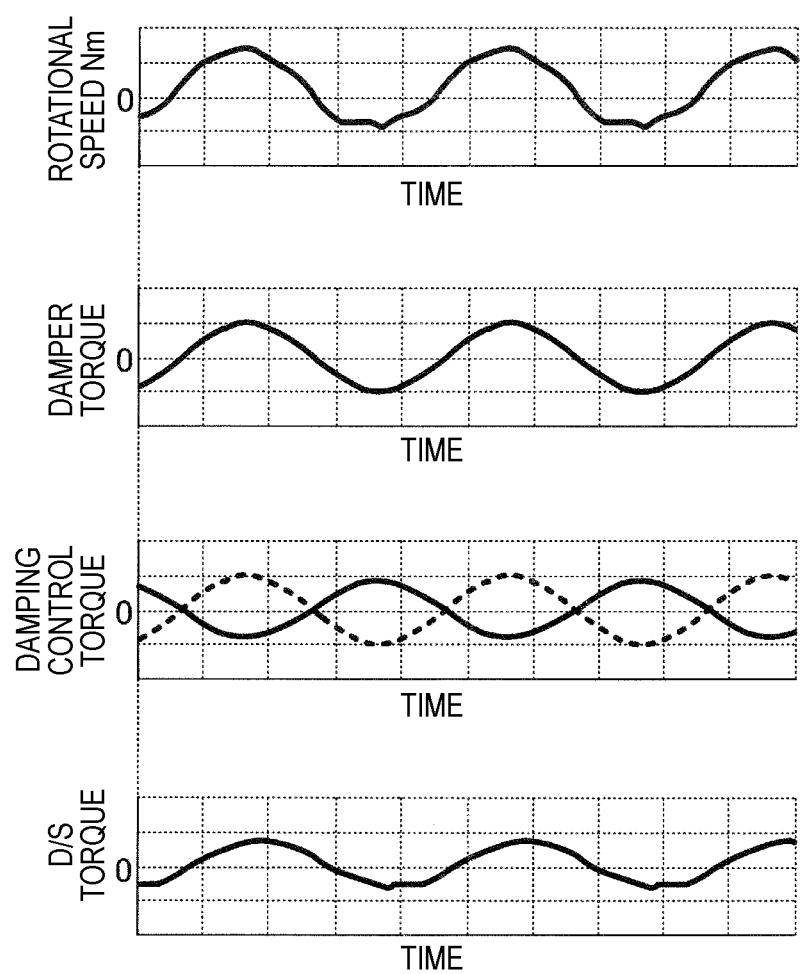
FIG. 7 is a graph for explaining the magnitude of torque fluctuation (amplitude) of a drive shaft in a case where a damping control torque is input in control A.

In a situation where the control A is executed, as illustrated in FIG. 7, the motor rotational speed Nm of the electric motor 15 periodically varies under the influence of the viscous torque component or the inertia torque component, and the damper torque including the motor torque Tmg depending on the motor rotational speed Nm periodically varies. When the electric motor 15 generates, with respect to the damper torque, a damping control torque Tv (i.e., the motor torque reduction component Te_m) having a reverse phase with respect to the damper torque, the amplitude that indicates variation in the torque Td to be transmitted to the drive shaft 18 (hereinafter, the torque Td being referred to as a "D/S torque Td") decreases. As a result, the vibration generated in the power train is suppressed.

In addition, when the engine pulsation frequency fe is equal to or greater than the first frequency f1 and is also equal to or less than the second frequency f2, in other words, when the engine pulsation frequency fe is close to the damper resonance frequency fs, the relative rotation between the crankshaft 16 and the input shaft 17 increases. Thus, the torsion damper unit 12b inputs the torsion torque Tdamp to the power train. Therefore, when the engine pulsation frequency fe is equal to or greater than the first frequency f1 and is also equal to or less than the second frequency f2, in other words, in the control B, the vibration due to the torsion torque Tdamp and the motor torque Tmg is generated in the power train.

In a case of the control B, the control apparatus 30 calculates the torque command Tm based on the motor torque reduction component Te_m and the torsion torque reduction component Te_d according to the above Equation 3. Then, the control apparatus 30 determines the damping control torque command Tm_req, and controls the driving of the electric motor 15 based on the damping control torque command Tm_req, so that the electric motor 15 outputs the damping control torque Tv to the power train.

Figure 8:
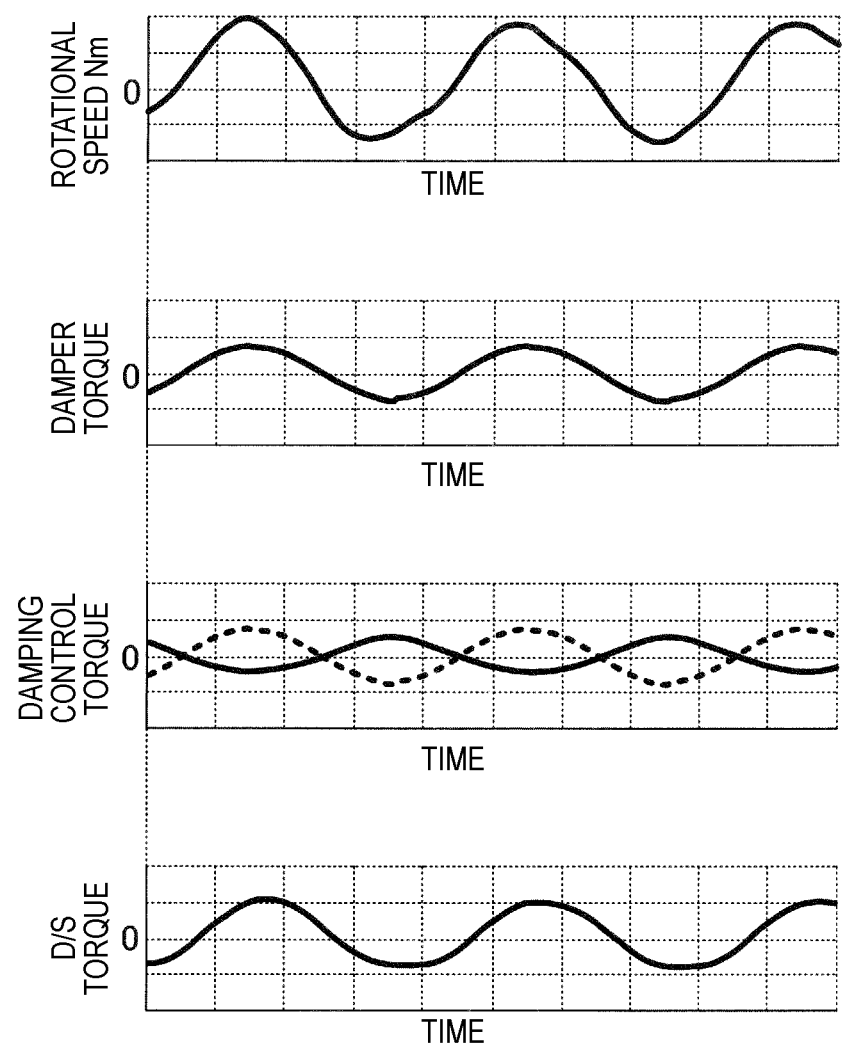
FIG. 8 is a graph for explaining the magnitude of torque fluctuation (amplitude) of the drive shaft in a case where a damping control torque is input in control B.

In a situation where the control B is executed, as illustrated in FIG. 8, the motor rotational speed Nm of the electric motor 15 is a higher speed, compared to a case of the control A illustrated in FIG. 7 and periodically varies, and the damper torque periodically varies under the influence of the torsion torque Tdamp of the torsion damper unit 12b. When the electric motor 15 generates, with respect to the damper torque, the damping control torque Tv (i.e., the torsion torque reduction component Te_d) having a reverse phase with respect to the damper torque, the amplitude of the D/S torque Td to be transmitted to the drive shaft 18 decreases. As a result, the vibration generated in the power train is suppressed.

In addition, when the engine pulsation frequency fe is higher than the second frequency f2, the motor torque Tmg including the viscous torque component or the inertia torque component of the electric motor 15 decreases, whereas the relative rotation of the crankshaft 16 and the input shaft 17 easily occurs. Thus, when the engine pulsation frequency fe is higher than the second frequency f2, the vibration caused mainly by the torsion torque Tdamp of the torsion damper unit 12b is generated in the power train.

When the engine pulsation frequency fe is higher than the second frequency f2, in other words, in the control C, the control apparatus 30 calculates the torque command Tm based on the torsion (91-92) of the torsion damper unit 12b according to the above Equation 4. Then, when the control apparatus 30 determines the damping control torque command Tm_req, and controls the driving of the electric motor 15 based on the damping control torque command Tm_req, the electric motor 15 outputs the damping control torque Tv to the power train.

Figure 9:
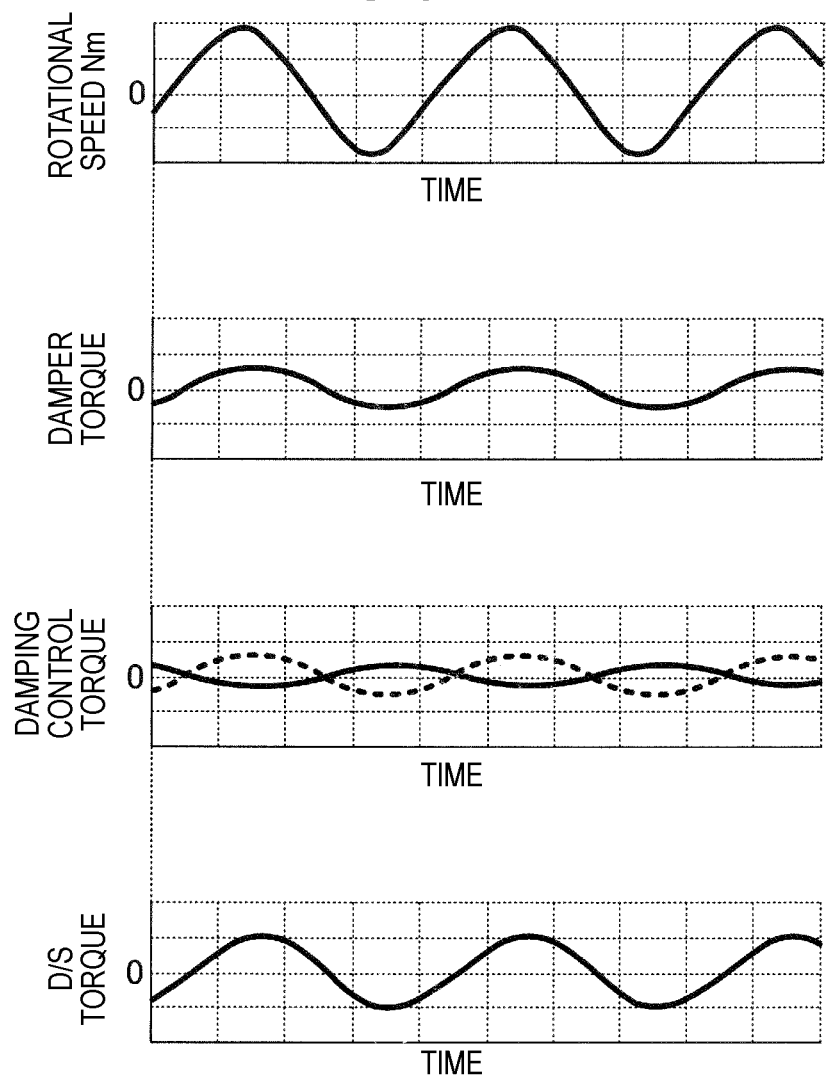
FIG. 9 is a graph for explaining the magnitude of torque fluctuation (amplitude) of the drive shaft in a case where a damping control torque is input in control C.

In a situation where the control C is executed, as illustrated in FIG. 9, the motor rotational speed Nm of the electric motor 15 is a higher speed, compared to a case of the control B illustrated in FIG. 8 and periodically varies, and the damper torque periodically varies under the influence of the torsion torque Tdamp of the torsion damper unit 12b. When the electric motor 15 generates, with respect to the damper torque, the damping control torque Tv (i.e., the torsion torque reduction component Te_d) having a reverse phase with respect to the damper torque, the vibration generated in the power train is suppressed.

As can be understood from the above description, the control apparatus 30 of the vehicle of the above embodiment is applied to the vehicle 10, which includes the engine 11, the transmission 13, the clutch unit 12a of the clutch/damper 12, which connects and disconnects the crankshaft 16 of the engine 11 and the input shaft 17 of the transmission 13, the torsion damper unit 12b of the clutch/damper 12, which allows the relative rotation of the crankshaft 16 and the input shaft 17 by torsional deformation in the connection state of the clutch unit 12a, the wheels 14 connected to the drive shaft 18 of the transmission 13, and the electric motor 15 connected to the transmission 13, which is one of the input shaft 17, the transmission 13, and the drive shaft 18, which constitute the power train that transmits the power (engine torque) of the engine 11 to the wheels 14.

The control apparatus 30 includes the frequency calculation unit 32, which controls the driving of the electric motor 15, calculates the engine pulsation frequency fe that indicates the frequency of torque pulsation generated in the engine 11 in proportion to the engine rotational speed Ne of the engine 11, and also calculates the damper resonance frequency fs at which the torsion damper unit 12b resonates with the engine pulsation frequency fe in the torsional direction, the damping control content switching unit 33, which determines, using the engine pulsation frequency fe and the damper resonance frequency fs, a case where the engine pulsation frequency fe is less than the first frequency f1 obtained by subtracting the first predetermined value X from the damper resonance frequency fs, a case where the engine pulsation frequency fe is equal to or greater than the first frequency f1 and is also equal to or less than the second frequency f2 obtained by adding the second predetermined value Y to the damper resonance frequency fs, and a case where the engine pulsation frequency fe is greater than the second frequency f2, and switches damping control content to suppress the vibration generated in the power train, the gain calculation unit 34, which calculates the first gain G1 to the fourth gain G4, which are gains used for the torque command Tm for driving the electric motor 15, using the engine pulsation frequency fe and the damper resonance frequency fs according to the damping control content switched by the damping control content switching unit 33, the torque calculation unit 35, which calculates the torque command Tm by multiplying at least one of the torsion torque reduction component Te_d, having a reverse phase with respect to the torsion torque Tdamp generated by the torsion damper unit 12b, and the motor torque reduction component Te_m, having a reverse phase with respect to the motor torque generated according to the rotation of the electric motor 15, by the first gain G1 to the fourth gain G4 calculated by the gain calculation unit 34, the command torque determination unit 37, which determines the damping control torque command Tm_req, which generates the damping control torque Tv in the electric motor 15 for suppressing the vibration generated in the power train, based on the torque command Tm, and the drive control unit 38, which controls the driving of the electric motor 15 based on the damping control torque command Tm_req and generates the damping control torque Tv in the electric motor 15. In this case, the command torque determination unit 37 may determine the damping control torque command Tm_req by performing an upper/lower limit processing on the torque command Tm.

In this case, more specifically, the gain calculation unit 34 includes the first adjustment gain calculation unit 34-1, which calculates the first gain G1, which becomes the minimum value when the engine pulsation frequency fe coincides with the first frequency f1, in a case of the control A in which the engine pulsation frequency fe is less than the first frequency f1, the second adjustment gain calculation unit 34-2, which calculates the second gain G2, which decreases as the engine pulsation frequency fe increases from the first frequency f1 toward the second frequency f2, and the third gain G3, which increases as the engine pulsation frequency fe increases from the first frequency f1 toward the second frequency f2 in a case of the control B in which the engine pulsation frequency fe is equal to or greater than the first frequency f1 and is also equal to or less than the second frequency f2, and the third adjustment gain calculation unit 34-3, which calculates the fourth gain G4, which becomes the maximum value when the engine pulsation frequency fe coincides with the second frequency f2 in a case of the control C in which the engine pulsation frequency fe is greater than the second frequency f2.

In addition, the torque calculation unit 35 includes the first torque calculation unit 35-1, which calculates the torque command Tm by multiplying the motor torque reduction component by the first gain G1 in a case of the control A in which the engine pulsation frequency fe is less than the first frequency f1, the second torque calculation unit 35-2, which calculates the torque command Tm by summing up the value, which is calculated by multiplying the motor torque reduction component Te_ m by the second gain, and the value, which is calculated by multiplying the torsion torque reduction component Te_d by the third gain G3 in a case of the control B in which the engine pulsation frequency fe is equal to or greater than the first frequency f1 and is equal to or less than the second frequency f2, and the third torque calculation unit 35-3, which calculates the torque command Tm by multiplying the torsion torque reduction component Te_d by the fourth gain G4 in a case where the engine pulsation frequency fe is greater than the second frequency f2.

According to these, the control apparatus 30 may determine the control A in which the engine pulsation frequency fe is less than the first frequency f1, the control B in which the engine pulsation frequency fe is equal to or greater than the first frequency f1 and is also equal to or less than the second frequency f2, and the control C in which the engine pulsation frequency fe is greater than the second frequency f2, and may switch the damping control content according to the control A to the control C. Then, the control apparatus 30 may calculate the torque command Tm by calculating the first gain G1 multiplied by the motor torque reduction component Te_m in the control A, the second gain G2 multiplied by the motor torque reduction component Te_m and the third gain G3 multiplied by the torsion torque reduction component Te_d in the control B, and the fourth gain G4 multiplied by the torsion torque reduction component Te_d in the control C, and may finally control the driving of the electric motor 15 based on the damping control torque command Tm_req. Thereby, it is possible to satisfactorily suppress (attenuate) the vibration generated in the power train during the driving of the vehicle 10 and to prevent the driver from feeling discomfort by perceiving uncomfortable vibration or the sound entering the vehicle room (e.g., booming noise).

In addition, in this case, the control apparatus 30 includes the filter processing unit, which sets the band pass filter F(s) having the engine pulsation frequency fe as a pass band, and calculates the post-filter torque command Tm_bpf by performing a band pass filter processing on the torque command Tm, and the command torque determination unit 37 calculates the damping control torque command Tm_req based on the post-filter torque command Tm_bpf.

In this case, the command torque determination unit 37 may determine the damping control torque command Tm_req by performing an upper/lower limit processing on the post-filter torque command Tm_bpf.

According to this, the damping control torque Tv input to the power train from the electric motor 15 does not include the frequency band required for the engine 11 to accelerate and decelerate the vehicle 10. Thereby, the damping control torque Tv may satisfactorily suppress (attenuate) the vibration generated in the power train without affecting the acceleration or deceleration of the vehicle 10.

In addition, in this case, the control apparatus 30 includes the damping necessity determination unit 31, which determines whether or not to generate the damping control torque Tv in the electric motor 15 according to the clutch stroke amount Sc directed toward the connection direction of the clutch unit 12a of the clutch/damper 12, and the command torque determination unit 37 determines the damping control torque command Tm_req to be zero ("0") when it is determined by the damping necessity determination unit 31 that the generation of the damping control torque Tv is unnecessary.

According to this, the damping control torque Tv may be generated in the electric motor 15 only when the vibration is generated in the power train. Thereby, a configuration of the control apparatus 30 may be simplified.

In addition, in this case, the torque calculation unit 35 may calculate the torsion torque reduction component Te_d using the damper stiffness K preset in the torsion damper unit 12b in the torsional direction, the crank angle θ1 of the crankshaft 16, and the motor rotation angle θ2 of the electric motor 15, and may calculate the motor torque reduction component Te_m using the motor rotation angle θ2 of the electric motor 15.

In addition, in this case, the frequency calculation unit 32 may calculate the engine pulsation frequency fe using the engine rotational speed Ne of the engine 11 calculated from the crank angle θ1 of the crankshaft 16, and may calculate the damper resonance frequency fs according to the shift position M, which is the gear position of the transmission 13.

According to this, it is possible to calculate the torsion torque reduction component, the motor torque reduction component, the engine pulsation frequency fe, and the damper resonance frequency fs without providing any special sensors. Thus, a configuration of the control apparatus 30 may be simplified.

The implementation of this disclosure is not limited to the above embodiment, and various modifications are possible without departing from the object of this disclosure.

For example, in the above-described embodiment, the first gain G1 to the fourth gain G4 are calculated with reference to the engine pulsation frequency-gain map illustrated in FIG. 4 using the engine pulsation frequency fe calculated by the control apparatus 30. In this case, the calculated first gain G1 to fourth gain G4 are assumed to be constant regardless of variation in the engine pulsation frequency fe. Thereby, the calculated first gain G1 becomes the minimum value when the engine pulsation frequency fe coincides with the first frequency f1, and the fourth gain G4 becomes the maximum value when the engine pulsation frequency fe coincides with the second frequency f2. Alternatively, the control apparatus 30 may calculate the first gain G1 to the fourth gain G4 with reference to the engine pulsation frequency-gain map illustrated in FIG. 10.

Figure 10:
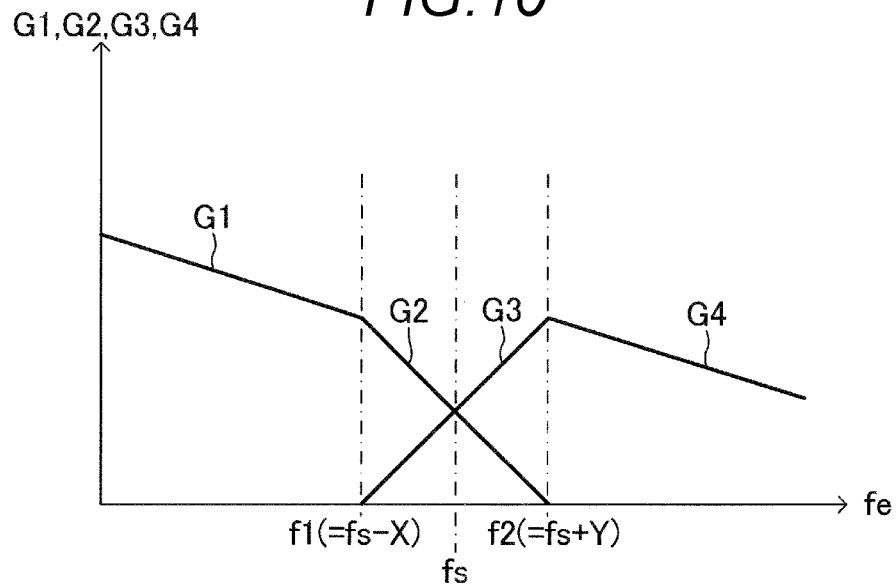
FIG. 10 is a graph illustrating a relationship between an engine pulsation frequency and a first gain and a second gain according to a modification of the embodiment.

In a case where the control apparatus 30 refers to the map illustrated in FIG. 10, the calculated first gain G1 is calculated so as to decrease as the engine pulsation frequency fe increases toward the first frequency f1 and to become the minimum value when the engine pulsation frequency fe coincides with the first frequency f1. In addition, the calculated fourth gain G4 is calculated so as to decrease as the engine pulsation frequency fe becomes larger than the second frequency f2 and to become the maximum value when the engine pulsation frequency fe coincides with the second frequency f2. In addition, when the control apparatus 30 refers to the map of FIG. 10, the second gain G2 is calculated so as to decrease proportionally as the engine pulsation frequency fe increases toward the second frequency f2, and the third gain G3 is calculated so as to increase proportionally as the engine pulsation frequency fe increases toward the second frequency f2.

Even in a case where the control apparatus 30 calculates the first gain G1 to the fourth gain G4 with reference to the engine pulsation frequency-gain map illustrated in FIG. 10, as in a case of the above embodiment, the control apparatus 30 may calculate the torque command Tm based on the control A to the control C according to the above Equation 2 to Equation 4. Thus, even in this case, the same effect as the above embodiment may be obtained.

In addition, in the above embodiment, in a case of the control A, as apparent from the above Equation 2, the torque command Tm is calculated using only the motor rotational speed Nm of the electric motor 15 as the motor torque reduction component Te_m by multiplying the motor rotational speed Nm, that is, the motor torque reduction component Te_m by the first gain G1. In addition, in a case of the control C, as apparent from the above Equation 4, the torque command Tm is calculated using only the torsion torque reduction component Te_d by multiplying the torsion torque reduction component Te_d by the fourth gain G4.

Alternatively, as in a case of the control B, also in the control A and the control C, the torque command Tm may be calculated by summing up the value, obtained by multiplying the motor rotational speed Nm (the torque reduction component Te_d) by the first gain G1, and the value, obtained by multiplying the torsion torque reduction components Te_d by the fourth gain G4. In this case, in the control A, the first gain G1 is determined as a value greater than the fourth gain G4, and in the control C, the fourth gain G 4 is determined as a value greater than the first gain G1. In this manner, by determining the first gain G1 and the fourth gain G4, the motor torque reduction component Te_m may effectively reduce the motor torque Tmg to be input to the power train in the control A, and the torsion torque reduction component Te_d may effectively reduce the torsional torque Tdamp to be input to the power train in the control C. Thus, the same effect as the above embodiment may be obtained.

In addition, in the above embodiment, the control apparatus 30 calculates (obtains) a desired value with reference to various preset maps as illustrated in FIGS. 3, 4, and 5. Alternatively, the control apparatus 30 may directly calculate a desired value using a preset function that indicates relationships illustrated in the maps of FIGS. 3 to 5.

In addition, in the above embodiment, the transmission 13 mounted on the vehicle 10 is a stepped transmission (e.g., an automatic transmission (AT), a manual transmission (MT), or an automated/manual transmission (AMT)). In this case, the transmission 13 may be a continuously variable transmission (e.g., a CVT).

When the transmission 13 is a continuously variable transmission, the shift position sensor 25, which detects the shift position M, is omitted. Therefore, the control apparatus 30 (the frequency calculation unit 32) may obtain (detect) the speed change ratio of the transmission 13 to calculate the crank-damper resonance frequency fs by storing a relationship between the speed change ratio and the damper resonance frequency fs in advance, for example.

In addition, in the above embodiment, the command torque determination unit 37 determines the damping control torque command Tm_req by performing an upper/lower limit processing on the second torque command Tm_bpf. However, for example, when the calculated second torque command Tm_bpf is within the range of the performance of the electric motor 15 and the preset damping performance target, the command torque determination unit 37 may omit the upper/lower limit processing, and may determine the damping control torque command Tm_req.

In addition, in the above embodiment, the control apparatus 30 includes the filter processing unit 36. However, for example, when a first torque command Tm calculated by the torque calculation unit 35 does not include a frequency component required for the engine 11 to accelerate or decelerate the vehicle 10, the filter processing unit 36 may be omitted. In this case, the command torque determination unit 37 may determine the damping control torque command Tm_req by performing an upper/lower limit processing on the first torque command Tm.

In addition, in the above embodiment, the control apparatus 30 includes the damping necessity determination unit 31. However, it is also possible to omit the damping necessity determination unit 31. In this case, the control apparatus 30 constantly generates the damping control torque Tv in the electric motor 15, and suppresses the vibration generated in the power train.

In addition, in the above embodiment, the control apparatus 30 (the frequency calculation unit 32) calculates the engine rotational speed Ne by receiving the crank angle θ1 input from the crank angle sensor 21, and calculates the engine pulsation frequency fe of the engine 11 using the engine rotational speed Ne. In this way, instead of using the crank angle θ1, for example, it is possible to directly detect the engine rotational speed Ne of the engine 11, or to calculate the engine rotational speed Ne from, for example, the motor rotational speed Nm of the electric motor 15, the rotational speed of the input shaft 17 or an output shaft of the transmission 13, the rotational speed of the drive shaft 18 or a propeller shaft, or the wheel speed of the wheels 14. Even in this case, it is possible to calculate the engine pulsation frequency fe according to the above Equation 1 using the engine rotational speed Ne.

Modification

In the above embodiment, the following configuration may be adopted. That is, in the above-described embodiment, only the cases of the control A, the control B, and the control C are performed to calculate the gains and the torque command in steps S16 to S21 and to perform the processing after step S22, but the disclosure is not limited thereto, and a first post-filter torque command Tm may be calculated after calculating the first gain G1 and the second gain G2. Different parts will be described below.

In a modification, the first gain G1 is a gain multiplied by the torsion torque reduction component Te_d that reduces the torsion torque Tdamp generated by the torsion damper unit 12b, and the second gain G2 is a gain multiplied by the inertia torque reduction component Te_m that reduces the motor inertia torque Tgi of the electric motor 15.

The torsion torque Tdamp is a torque that is generated due to torsional deformation generated in the torsion damper unit 12b by the relative rotation generated between the crankshaft 16 and the input shaft 17. The relative rotation between the crankshaft 16 and the input shaft 17 increases when the engine pulsation frequency fe varies so as to coincide with the damper resonance frequency fs, and in particular, decreases as the engine pulsation frequency fe moves from the damper resonance frequency fs to the low frequency side. Thus, the torsion torque Tdamp increases when the engine pulsation frequency fe varies so as to coincide with the damper resonance frequency fs, and decreases as the engine pulsation frequency fe moves from the damper resonance frequency fs to the low frequency side.

On the other hand, the motor inertia torque Tgi is proportional to the rotational speed of the electric motor 15, more specifically, the rotational angular acceleration of the electric motor 15. Therefore, when the electric motor 15 is driven, the motor inertia torque Tgi is generated in a situation where the rotational speed of the electric motor 15 varies, in other words, in a situation where the rotational angular acceleration of the electric motor 15 varies.

When the electric motor 15 is driven in a situation where the damper torque in which the engine pulsation frequency fe is less than the damper resonance frequency fs is transmitted to the electric motor 15, the rotational angular acceleration of the electric motor 15 varies under the influence of the torque pulsation of a relatively low frequency. That is, when the engine pulsation frequency fe is less than the damper resonance frequency fs, variation in the rotational angular acceleration of the electric motor 15 increases, and the motor inertia torque Tgi in the electric motor 15 increases.

Conversely, when the electric motor 15 is driven in a situation where the damper torque in which the engine pulsation frequency fe is greater than the damper resonance frequency fs is transmitted to the electric motor 15, the rotational angular acceleration of the electric motor 15 varies under the influence of the torque pulsation of a relatively high frequency. That is, when the engine pulsation frequency fe is greater than the damper resonance frequency fs, variation in the rotational angular acceleration of the electric motor 15 decreases, and the motor inertia torque Tgi in the electric motor 15 decreases.

Thus, the torsion torque Tdamp and the motor inertia torque Tgi, the magnitudes of which vary depending on the engine pulsation frequency fe, generate unnecessary vibration in the power train after the input shaft 17. Thus, the gain calculation unit 34 calculates the first gain G1 and the second gain G2 for allowing the torque calculation unit 35 to calculate the first torque command Tm, which drives the electric motor 15 so as to offset the torsion torque Tdamp and the motor inertia torque Tgi.

Specifically, the gain calculation unit 34 receives the engine pulsation frequency fe and the damper resonance frequency fs input from the frequency calculation unit 32. The gain calculation unit 34 calculates the first gain G1 and the second gain G2, which correspond to the engine pulsation frequency fe, with reference to the engine pulsation frequency-gain map illustrated hereinafter using the engine pulsation frequency fe and the damper resonance frequency fs input thereto.

Figure 11:
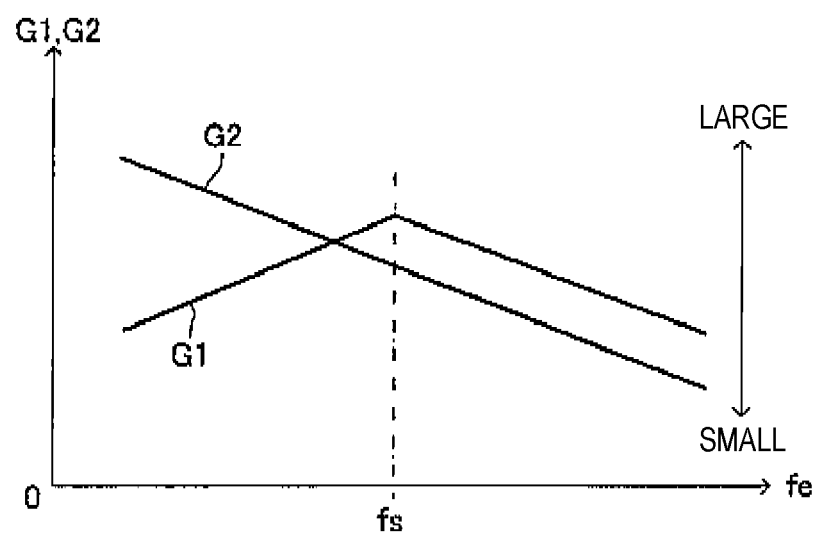
FIG. 11 is a modification of the graph illustrating the relationship between the engine pulsation frequency and the first gain and the second gain illustrated in FIG. 4.

Here, as illustrated in FIG. 11, in accordance with a variation characteristic of the torsion torque Tdamp corresponding to the engine pulsation frequency fe, the first gain G1 has a variation characteristic in which it linearly increases as the engine pulsation frequency fe varies so as to coincide with the damper resonance frequency fs, and linearly decreases as the engine pulsation frequency fe moves away from the damper resonance frequency fs. In addition, the second gain G2 has a variation characteristic in which it linearly decreases as the engine pulsation frequency fe increases in accordance with a variation characteristic of the motor inertia torque Tgi corresponding to the engine pulsation frequency fe.

In particular, the vibration, which is generated in the power train when the engine pulsation frequency fe is less than the damper resonance frequency fs, is generated due to the motor inertia torque Tgi rather than the torsion torque Tdamp. Therefore, when the engine pulsation frequency fe is less than the damper resonance frequency fs, the gain calculation unit 34 calculates the first gain G1 and the second gain G2 so that the second gain G2 becomes larger than the first gain G1. In addition, the vibration, which is generated when the engine pulsation frequency fe is greater than the damper resonance frequency fs, is generated due to the torsion torque Tdamp rather than the motor inertia torque Tgi. Therefore, when the engine pulsation frequency fe is greater than the damper resonance frequency fs, the gain calculation unit 34 calculates the first gain G1 and the second gain G2 so that the first gain G1 becomes larger than the second gain G2. The gain calculation unit 34 outputs the calculated first gain G1 and second gain G2 to the torque calculation unit 35.

The torque calculation unit 35 receives the crank angle θ1 input from the crank angle sensor 21 and the motor rotation angle θ2 input from the motor rotation angle sensor 22. Then, the torque calculation unit 35 calculates the first torque command Tm, which drives the electric motor 15 so as to suppress the vibration generated in the power train after the input shaft 17 using the crank angle θ1 and the motor rotation angle θ2 and the first gain G1 and the second gain G2 input from the gain calculation unit 35, and outputs the calculated first torque command Tm to the filter processing unit 35.

As illustrated in a conceptual torque transmission system, a motion equation in which a torque T1 is input to the transmission 13 from the engine 11 via the clutch/damper 12, a torque Tg is input from the electric motor 15 to the transmission 13, and a torque T2 is output from the transmission 13 to the wheels 14 via the drive shaft 18 is conceivable.

In this case, the following Equation 5 is established in the transmission 13, and the following Equation 6 is established in the electric motor 15. In addition, in the following Equations 5 and 6, a positive sign is given to a torque input to the transmission 13 and to the electric motor 15, and a negative sign is given to a torque output from the transmission 13 and from the electric motor 15.

$$Itm \times \ddot{\theta}3 = T1 - T2 + K1 \times (\theta3 - \theta2) \qquad \text{Equation 5}$$

$$Ig \times \ddot{\theta}2 = K1 \times (\theta3 - \theta2) - Tg \qquad \text{Equation 6}$$

However, in the above Equation 5, "Itm" represents, for example, the moment of inertia of the transmission 13, and "θ3" represents, for example, the rotation angle of the transmission 13. In addition, in the above Equation 6, "Ig" represents the moment of inertia of the electric motor 15, and "K1" represents, for example, the torsional rigidity of the motor shaft 19.

Here, since the torque K1×(θ3−θ2) input from the electric motor 15 to the transmission 13 is reversed in phase so as to cancel the torque T1 input to the transmission 13 from the clutch/damper 12, the following Equation 2 is established.

$$-K1 \times (\theta1 - \theta2) = T1 \qquad \text{Equation 7}$$

Thus, the following Equation 8 is established.

$$Ig \times \ddot{\theta}2 = -T1 - Tg \qquad \text{Equation 8}$$

Assuming that the damper stiffness, which is the torsional stiffness of the torsion damper unit 12b of the clutch/damper 12, is K, when relative rotation occurs between the crankshaft 16 and the input shaft 17, the torque T1 input to the transmission 13 from the clutch/damper 12, that is, the torsion torque Tdamp, may be expressed by the following Equation 9.

$$T1 = Tdamp = K \times (\theta1 - \theta2) \qquad \text{Equation 9}$$

In summary, the motor torque Tg output by the electric motor 15 is expressed by the following Equation 10.

$$\begin{aligned} Tg &= T1 - Ig \times \ddot{\theta}2 \\ &= -K(\theta1 - \theta2) - Ig \times \ddot{\theta}2 \end{aligned} \qquad \text{Equation 10}$$

According to the motor torque Tg expressed by the above Equation 10, a torque component of the first term on the right side of the above Equation 10 acts as the torsion torque reduction component Te_d, which is reversed in phase with respect to the torsion torque Tdamp input to the power train via the clutch/damper 12, and a torque component of the second term on the right side of the above Equation 10 acts as the inertia torque reduction component Te_m, which is reversed in phase with respect to the motor inertia torque Tgi input to the transmission 13 according to the rotation of the electric motor 15.

Incidentally, the greater the relative rotation difference between the crankshaft 16 and the input shaft 17, the greater the torsion torque Tdamp. In this case, the relative rotation difference becomes largest when the engine pulsation frequency fe coincides with the damper resonance frequency fs of the torsion damper unit 12b of the clutch/damper 12, and decreases as the engine pulsation frequency fe moves away from the damper resonance frequency fs. On the other hand, the motor inertia torque Tgi decreases as the rotational speed of the electric motor 15 increases. Here, the electric motor 15 is directly connected to the motor shaft 19, and the rotation of the motor shaft 19 is the rotation of the input shaft 17, that is, the rotation of the crank shaft 16, and is influenced by the engine rotational speed Ne. Therefore, the rotational speed of the electric motor 15 decreases as the engine rotational speed Ne, in other words, the engine pulsation frequency fe increases.

Accordingly, in order to suppress the vibration generated in the power train, the torque calculation unit 35 calculates the first torque command Tm according to the following Equation 11 in which the value, which is obtained by multiplying the first gain G1 calculated by the gain calculation unit 34 by the torsion torque reduction component Te_d represented by the first term on the right side of the above Equation 10, and the value, which is obtained by multiplying the second gain G2 by the inertia torque reduction component Te_m represented by the second term on the right side are summed up.

$$Tm = -G1 \times K \times (\theta 1 - \theta 2) - G2 \times Ig \times \ddot{\theta} 2 \qquad \text{Equation 11}$$

The torque calculation unit 34 may output the calculated first torque command Tm to the filter processing unit 35.

According to the modification described above, the following effects may be obtained.

The command torque determination unit 36 may determine the damping control torque command Tm_req by performing an upper/lower limit processing on the first torque command Tm.

The control apparatus 30 may calculate the first gain G1 and the second gain G2 according to the engine pulsation frequency fe to change the magnitude (ratio) of the torsion torque reduction component Te_d and the inertia torque reduction component Te_m, and may generate the damping control torque Tv in the electric motor 15 to suppress (attenuate) the vibration generated in the power train. Thereby, in particular, when the engine pulsation frequency fe is less than the damper resonance frequency fs, a large second gain G2 may be calculated so as to suppress (attenuate) the vibration generated in the power train due to the motor inertia torque Tgi, which is the inertia torque component. Thus, during the driving of the vehicle 10, it is possible to satisfactorily suppress (attenuate) the vibration generated in the power train, and to prevent the driver from feeling discomfort by perceiving uncomfortable vibrations or sounds entering the vehicle room (e.g., booming noise).

In addition, the control apparatus 30 includes the filter processing unit 35, which sets a band pass filter having the engine pulsation frequency fe as a pass band and performs a band pass filter processing on the first torque command Tm to calculate the second torque command Tm_bpf, and the command torque determination unit 36 calculates the damping control torque command Tm_req based on the second torque command Tm_bpf.

In this case, the command torque determination unit 36 may determine the damping control torque command Tm_req by performing an upper/lower limit processing on the second torque command Tm_bpf.

The damping control torque Tv input from the electric motor 15 to the power train does not include the frequency band required for the engine 11 to accelerate and decelerate the vehicle 10. Thereby, the damping control torque Tv may satisfactorily suppress (attenuate) the vibration generated in the power train without affecting the acceleration or deceleration of the vehicle 10.

In addition, in this case, the control apparatus 30 includes the damping necessity determination unit 31, which determines whether or not to generate the damping control torque Tv in the electric motor 15 according to the clutch stroke amount Sc directed toward the connection direction of the clutch unit 12a of the clutch/damper 12, and the command torque determination unit 36 determines the damping control torque command Tm_req to be zero ("0") when it is determined by the damping necessity determination unit 31 that the generation of the damping control torque Tv is unnecessary.

According to this, it is possible to generate the damping control torque Tv in the electric motor 15 only when the vibration is generated in the power train. Thereby, a configuration of the control apparatus 30 may be simplified.

In addition, in this case, when the engine pulsation frequency fe is less than the damper resonance frequency fs, the gain calculation unit 33 sets the second gain G2 to be greater than the first gain G1. Moreover, the gain calculation unit 33 sets the first gain G1 to be greater than the second gain G2 when the engine pulsation frequency fe is higher than the damper resonance frequency fs.

According to this, when the engine pulsation frequency fe is lower than the damper resonance frequency, that is, when the vibration mainly including the motor inertia torque Tgi is generated in the power train, the second gain G2 to be multiplied by the inertia torque reduction component Te_m may be set to be greater than the first gain G1. In addition, when the engine pulsation frequency fe is higher than the damper resonance frequency, that is, when the vibration mainly including the torsion torque Tdamp is generated in the power train, the first gain G1 to be multiplied by the torsion torque reduction component Te_d may be set to be greater than the second gain G2. Thereby, it is possible to appropriately increase or decrease the torsion torque reduction component Te_d and the inertia torque reduction component Te_m according to the engine pulsation frequency fe, and it is possible to more satisfactorily suppress (attenuate) the vibration generated in the power train.

In addition, in this case, the torque calculation unit 34 may calculate the torsion torque Tdamp of the torsion damper unit 12b using the damper stiffness K, which is preset in the torsion damper unit 12b in the torsional direction, the crank angle θ1 of the crankshaft 16, the motor rotation angle θ2 of the electric motor 15, and may calculate the motor inertia torque Tgi of the electric motor 15 using the inertial moment Ig preset in the electric motor 15 and the rotational angular acceleration θ2" calculated from the motor rotational angle θ2 of the electric motor 1.

In addition, the frequency calculation unit 32 may calculate the engine pulsation frequency fe using the engine rotational speed Ne of the engine 11 calculated from the crank angle θ1 of the crankshaft 16, and may calculate the damper resonance frequency fs according to the shift position M, which is the gear position of the transmission 13.

According to this, it is possible to calculate the torsion torque Tdamp, the motor inertia torque Tgi, the engine pulsation frequency fe, and the damper resonance frequency fs without providing any special sensors. Thus, a configuration of the control apparatus 30 may be simplified.

In addition, in the above embodiment, the electric motor 15 is connected to the transmission 13, which constitutes the power train, via the motor shaft 19. Alternatively, it is also possible to connect the electric motor 15 to the input shaft 17 or the drive shaft 18, which constitutes the power train, via the motor shaft 19, or to directly connect the electric motor 15 thereto. Even in this case, by inputting the damping control torque Tv to the input shaft 17 or the drive shaft 18, the electric motor 15 may obtain the same effect as in the above embodiment.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control apparatus, which is applied to a vehicle to control driving of an electric motor of the vehicle, the vehicle including
   an engine;
   a transmission;
   a clutch configured to connect and disconnect a crankshaft of the engine and an input shaft of the transmission;
   a torsion damper configured to allow relative rotation of the crankshaft and the input shaft by torsional deformation in a connection state of the clutch;
   a wheel connected to a drive shaft of the transmission; and
   the electric motor connected to one of the input shaft, the transmission, and the drive shaft, which constitute a power train that transmits power of the engine to the wheel,
   the vehicle control apparatus comprising circuitry including a processor connected to a memory and configured to:
   calculate an engine pulsation frequency that indicates a frequency of torque pulsation generated in the engine in proportion to a rotational speed of the engine and to calculate a damper resonance frequency, at which the torsion damper resonates with the engine pulsation frequency in a torsional direction;
   switch a damping control content that suppresses vibration generated in the power train using the engine pulsation frequency and the damper resonance frequency;
   calculate a gain, used for a torque command for driving the electric motor, using the engine pulsation frequency and the damper resonance frequency according to the damping control content;
   calculate the torque command by multiplying the calculated gain by at least one of a torsion torque reduction component having a reverse phase with respect to a torsion torque generated by the torsion damper and a motor torque reduction component having a reverse phase with respect to a motor torque generated according to rotation of the electric motor;
   determine a damping control torque command, which generates, in the electric motor, a damping control torque for suppressing the vibration generated in the power train, based on the torque command; and
   control the driving of the electric motor based on the damping control torque command so as to generate the damping control torque in the electric motor,
   wherein the circuitry calculates a first gain, which increases as the engine pulsation frequency varies so as to coincide with the damper resonance frequency, and a second gain, which decreases as the engine pulsation frequency increases, and
   the circuitry calculates a first torque command that drives the electric motor by summing up a value calculated by multiplying the first gain by the torsion torque reduction component having the reverse phase with respect to the torsion torque generated by the torsion damper, and a value calculated by multiplying the second gain by an inertia torque reduction component having a reverse phase with respect to a motor inertia torque generated according to rotation of the electric motor.

2. The vehicle control apparatus according to claim 1, wherein the circuitry determines a case where the engine pulsation frequency is less than a first frequency obtained by subtracting a first predetermined value from the damper resonance frequency, a case where the engine pulsation frequency is equal to or greater than the first frequency and is also equal to or less than a second frequency obtained by adding a second predetermined value to the damper resonance frequency, and a case where the engine pulsation frequency is greater than the second frequency.

3. The vehicle control apparatus according to claim 2, wherein the circuitry is further configured to:
   calculate a first gain, which becomes a minimum value when the engine pulsation frequency coincides with the first frequency in the case where the engine pulsation frequency is less than the first frequency;
   calculate a second gain, which decreases as the engine pulsation frequency increases from the first frequency toward the second frequency, and a third gain, which increases as the engine pulsation frequency increases from the first frequency toward the second frequency, in the case where the engine pulsation frequency is equal to or greater than the first frequency and is also equal to or less than the second frequency; and
   calculate a fourth gain, which becomes a maximum value when the engine pulsation frequency coincides with the second frequency in the case where the engine pulsation frequency is greater than the second frequency;
   calculate the torque command by multiplying the motor torque reduction component by the first gain in the case where the engine pulsation frequency is less than the first frequency;
   calculate the torque command by summing up a value obtained by multiplying the motor torque reduction component by the second gain, and a value obtained by multiplying the torsion torque reduction component by the third gain, in the case where the engine pulsation frequency is equal to or greater than the first frequency and is also equal to or less than the second frequency; and
   calculate the torque command by multiplying the torsion torque reduction component by the fourth gain in the case where the engine pulsation frequency is greater than the second frequency.

4. The vehicle control apparatus according to claim 1, wherein the circuitry is further configured to determine whether or not to generate the damping control torque in the electric motor according to a clutch stroke amount directed in a connection direction of the clutch, and
   determine that the damping control torque command is zero when it is determined that generation of the damping control torque is unnecessary.

5. The vehicle control apparatus according to claim 1, wherein the circuitry determines the damping control torque command by performing an upper/lower limit processing on the torque command.

6. The vehicle control apparatus according to claim 1, wherein the circuitry is further configured to set a band pass filter having the engine pulsation frequency as a pass band and perform a band pass filter processing on the torque command to calculate a post-filter torque command, and
calculate the damping control torque command based on the post-filter torque command.

7. The vehicle control apparatus according to claim 1, wherein the circuitry is further configured to set the second gain to be greater than the first gain when the engine pulsation frequency is lower than the damper resonance frequency, or
set the first gain to be greater than the second gain when the engine pulsation frequency is higher than the damper resonance frequency.

8. The vehicle control apparatus according to claim 1, wherein the circuitry is further configured to
calculate the torsion torque of the torsion damper using a stiffness preset in the torsion damper in the torsional direction, a crank angle of the crankshaft, and a rotation angle of the electric motor, and
calculate the motor inertia torque of the electric motor using a moment of inertia preset in the electric motor and a rotational angular acceleration calculated from the rotation angle of the electric motor.

9. The vehicle control apparatus according to claim 1, wherein the circuitry is further configured to
calculate the engine pulsation frequency using the rotational speed of the engine calculated from the crank angle of the crankshaft, and calculate the damper resonance frequency according to a gear position of the transmission.

10. A vehicle control method to control an electric motor of a vehicle,
the vehicle including
an engine;
a transmission;
a clutch configured to connect and disconnect a crankshaft of the engine and an input shaft of the transmission;
a torsion damper configured to allow relative rotation of the crankshaft and the input shaft by torsional deformation in a connection state of the clutch;
a wheel connected to a drive shaft of the transmission; and
the electric motor connected to one of the input shaft, the transmission, and the drive shaft, which constitute a power train that transmits power of the engine to the wheel,
the method comprising:
calculating an engine pulsation frequency that indicates a frequency of torque pulsation generated in the engine in proportion to a rotational speed of the engine and calculating a damper resonance frequency, at which the torsion damper resonates with the engine pulsation frequency in a torsional direction;
switching a damping control content that suppresses vibration generated in the power train using the engine pulsation frequency and the damper resonance frequency;
calculating a gain, used for a torque command for driving the electric motor, using the engine pulsation frequency and the damper resonance frequency according to the damping control content;
calculating the torque command by multiplying the calculated gain by at least one of a torsion torque reduction component having a reverse phase with respect to a torsion torque generated by the torsion damper and a motor torque reduction component having a reverse phase with respect to a motor torque generated according to rotation of the electric motor;
determining a damping control torque command, which generates, in the electric motor, a damping control torque for suppressing the vibration generated in the power train, based on the torque command; and
controlling the driving of the electric motor based on the damping control torque command so as to generate the damping control torque in the electric motor,
wherein the method includes calculating a first gain, which increases as the engine pulsation frequency varies so as to coincide with the damper resonance frequency, and a second gain, which decreases as the engine pulsation frequency increases, and
the method includes calculating a first torque command that drives the electric motor by summing up a value calculated by multiplying the first gain by the torsion torque reduction component having the reverse phase with respect to the torsion torque generated by the torsion damper, and a value calculated by multiplying the second gain by an inertia torque reduction component having a reverse phase with respect to a motor inertia torque generated according to rotation of the electric motor.

* * * * *